United States Patent
Sugiyama et al.

(10) Patent No.: US 8,711,378 B2
(45) Date of Patent: *Apr. 29, 2014

(54) APPARATUS, METHOD AND PROGRAM FOR IMAGE RECEIPT, PROCESSING, CONVERSION, AND DELIVERY TO AND FROM A PLURALITY OF EXTERNAL APPARATUSES

(75) Inventors: Naoki Sugiyama, Kanagawa (JP); Hiroyuki Kawamoto, Kanagawa (JP); Isao Miyamoto, Kanagawa (JP); Takeharu Tone, Tokyo (JP); Taira Nishita, Tokyo (JP); Satoshi Ohkawa, Tokyo (JP); Atsushi Togami, Kanagawa (JP); Hiroshi Arai, Saitama (JP); Maki Ohyama, Kanagawa (JP); Yasunobu Shirata, Tokyo (JP); Masafumi Hamatake, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,814

(22) Filed: Jun. 26, 2012

(65) Prior Publication Data
US 2012/0327467 A1 Dec. 27, 2012

Related U.S. Application Data

(63) Continuation of application No. 11/152,383, filed on Jun. 15, 2005, now Pat. No. 8,237,937.

(30) Foreign Application Priority Data

Jun. 16, 2004 (JP) ................................. 2004-178545
Jun. 7, 2005 (JP) ................................. 2005-166692

(51) Int. Cl.
*G06F 3/12* (2006.01)
*G06F 15/16* (2006.01)

(52) U.S. Cl.
USPC .......................... 358/1.13; 358/1.15; 709/203

(58) Field of Classification Search
CPC .............................. G06F 3/1288; G06F 3/1297
See application file for complete search history.

(56) References Cited

U.S. PATENT DOCUMENTS

| 5,287,194 A | * | 2/1994 | Lobiondo | 358/296 |
| 5,872,901 A | * | 2/1999 | Konno et al. | 358/1.15 |
| 6,411,685 B1 | * | 6/2002 | O'Neal | 379/88.14 |

(Continued)

FOREIGN PATENT DOCUMENTS

| EP | 0 681 266 A1 | 11/1995 |
| EP | 0 681 266 B1 | 3/2000 |

(Continued)

*Primary Examiner* — Vincent Rudolph
(74) *Attorney, Agent, or Firm* — Dickstein Shapiro LLP

(57) ABSTRACT

An image processing apparatus includes a generator, a storage, an image data format converter, and a sender. The generator generates print image data for printing an image, based on image data sent from an external device. The storage stores the print image data. The image data format converter converts the print image data into image data in a format handled by an external device. The sender sends the converted image data via an IP (internet protocol) network to the external device. The image data format converter performs one of color space conversion, expansion, compression, resolution conversion, filtering, halftone processing, density gamma conversion, and noise removal in accordance with parameters determined based on at least one of property information of the print image data and property information requested by the external device.

12 Claims, 19 Drawing Sheets

(56) References Cited

U.S. PATENT DOCUMENTS

| | | |
|---|---|---|
| 2002/0023124 A1* | 2/2002 | Murayama ............... 709/203 |
| 2002/0080250 A1 | 6/2002 | Ogawa et al. |
| 2002/0141382 A1 | 10/2002 | Winther et al. |
| 2002/0156923 A1 | 10/2002 | Tanimoto |
| 2002/0181022 A1* | 12/2002 | Tokashiki ............... 358/1.18 |
| 2002/0186413 A1* | 12/2002 | Ito ............... 358/1.18 |
| 2002/0191694 A1 | 12/2002 | Ohyama et al. |
| 2002/0196470 A1 | 12/2002 | Kawamoto et al. |
| 2003/0002096 A1 | 1/2003 | Sugiyama |
| 2003/0030647 A1 | 2/2003 | Togami |
| 2003/0122825 A1 | 7/2003 | Kawamoto |
| 2003/0138143 A1* | 7/2003 | Noguchi ............... 382/167 |
| 2003/0184808 A1 | 10/2003 | Fukuda et al. |
| 2004/0008897 A1* | 1/2004 | Easwar ............... 382/250 |
| 2004/0013321 A1 | 1/2004 | Ohkawa |
| 2004/0114172 A1 | 6/2004 | Ohyama et al. |
| 2004/0125410 A1 | 7/2004 | Shirata et al. |
| 2004/0131263 A1 | 7/2004 | Kawamoto et al. |
| 2004/0136020 A1 | 7/2004 | Kumada |
| 2004/0156076 A1 | 8/2004 | Togami et al. |
| 2004/0263884 A1 | 12/2004 | Arai et al. |
| 2004/0263890 A1 | 12/2004 | Kawamoto et al. |
| 2005/0015386 A1* | 1/2005 | Mortensen et al. ........... 707/100 |
| 2005/0024666 A1 | 2/2005 | Ohyama et al. |
| 2005/0046881 A1 | 3/2005 | Tone et al. |

FOREIGN PATENT DOCUMENTS

| | | |
|---|---|---|
| EP | 1 404 104 A1 | 3/2004 |
| EP | 1 404 104 A1 | 3/2004 |
| JP | 06-243243 | 9/1994 |
| JP | 06-243243 A | 9/1994 |
| JP | 06-332636 | 12/1994 |
| JP | 06-332636 A | 12/1994 |
| JP | 9-234912 A | 9/1997 |
| JP | 9-277619 A | 10/1997 |
| JP | 9-297569 A | 11/1997 |
| JP | 10-190927 | 7/1998 |
| JP | 10-190927 A | 7/1998 |
| JP | 11-249835 | 9/1999 |
| JP | 11-249835 A | 9/1999 |
| JP | 2000-115688 | 4/2000 |
| JP | 2000-115688 A | 4/2000 |
| JP | 2000-333026 | 11/2000 |
| JP | 2001-051930 A | 2/2001 |
| JP | 2001-51930 A | 2/2001 |
| JP | 2001-157039 | 6/2001 |
| JP | 2001-157039 A | 6/2001 |
| JP | 2001-223828 A | 8/2001 |
| JP | 2001-273104 A | 10/2001 |
| JP | 2002-318760 A | 10/2002 |
| JP | 2003-333026 | 11/2003 |
| JP | 2004-112140 A | 4/2004 |
| JP | 2004-120023 A | 4/2004 |
| JP | 2004-194278 | 7/2004 |
| JP | 2004-194278 A | 7/2004 |

* cited by examiner

FIG. 7

| | DATA TYPE | COMPRESSION FORMAT | RESOLUTION |
|---|---|---|---|
| a | COLOR COPY DATA | MULTI-VALUE, LOSSY, FIXED-LENGTH COMPRESSION (CMYK) | 600 dpi |
| b | MONOCHROME COPY DATA | MULTI-VALUE, LOSSY, FIXED-LENGTH COMPRESSION (K) | 600 dpi |
| c | COLOR PRINT DATA | LOSSLESS VARIABLE-LENGTH COMPRESSION | 300 dpi, 600 dpi |
| d | MONOCHROME PRINT DATA | BINARY, LOSSLESS, VARIABLE-LENGTH COMPRESSION | 300 dpi, 600 dpi, 1,200 dpi |
| e | FAX DATA | BINARY, LOSSLESS, VARIABLE-LENGTH COMPRESSION | 200 dpi, 300 dpi, 400 dpi |

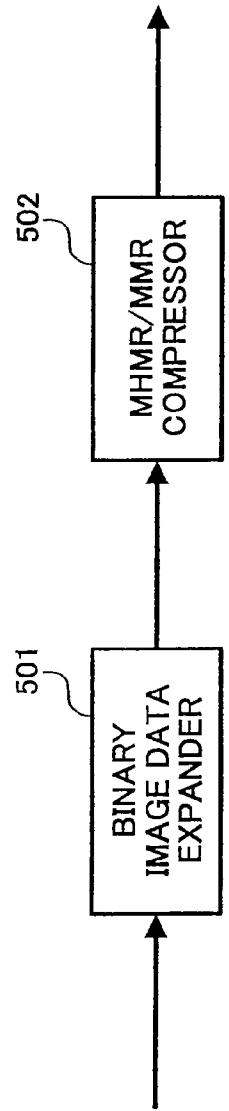

FIG. 8

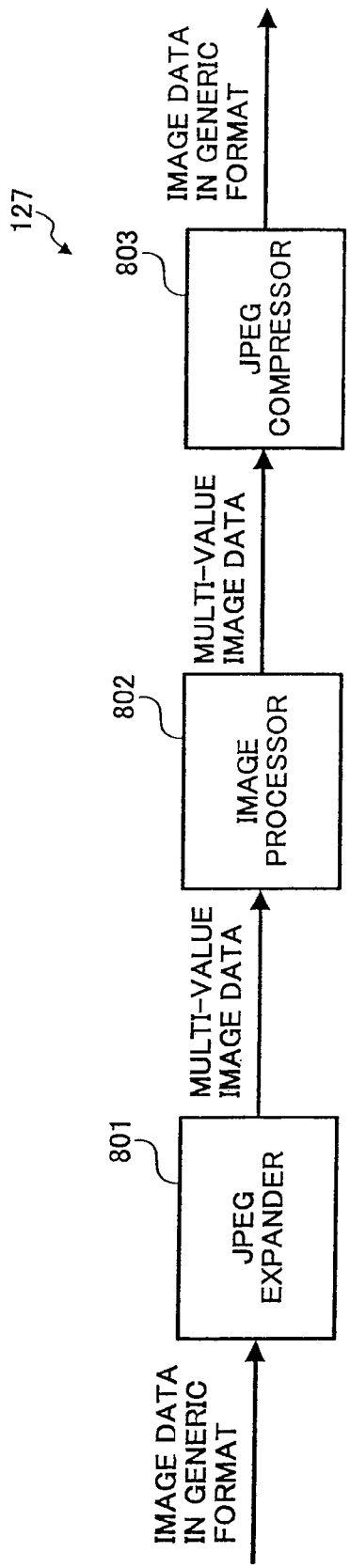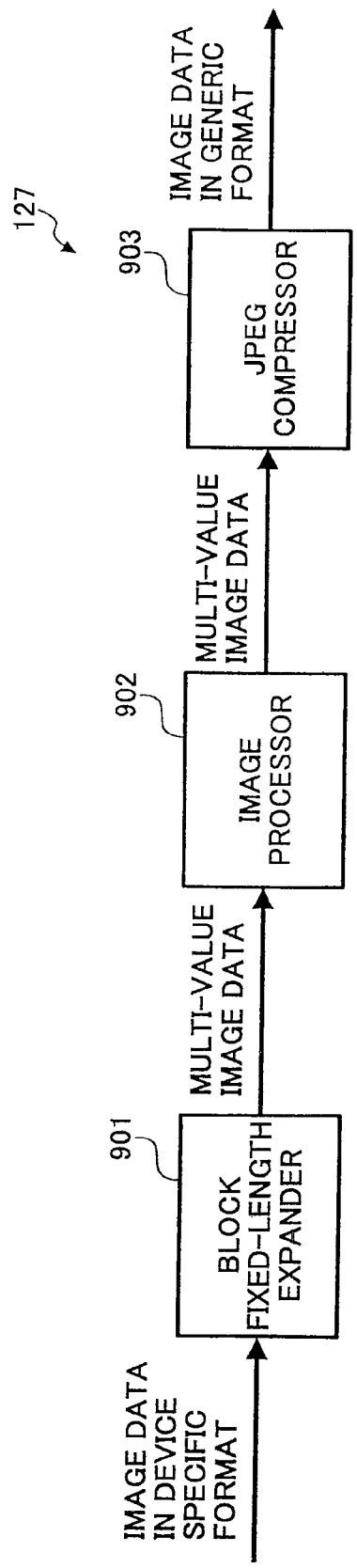

FIG. 19

X-AXIS →

Y-AXIS ↓

| $X_{m-2,n-2}$ | $X_{m-2,n-1}$ | $X_{m-2,n}$ | $X_{m-2,n+1}$ | $X_{m-2,n+2}$ |
|---|---|---|---|---|
| $X_{m-1,n-2}$ | $X_{m-1,n-1}$ | $X_{m-1,n}$ | $X_{m-1,n+1}$ | $X_{m-1,n+2}$ |
| $X_{m,n-2}$ | $X_{m,n-1}$ | $X_{m,n}$ | $X_{m,n+1}$ | $X_{m,n+2}$ |
| $X_{m+1,n-2}$ | $X_{m+1,n-1}$ | $X_{m+1,n}$ | $X_{m+1,n+1}$ | $X_{m+1,n+2}$ |
| $X_{m+2,n-2}$ | $X_{m+2,n-1}$ | $X_{m+2,n}$ | $X_{m+2,n+1}$ | $X_{m+2,n+2}$ |

1601

APPARATUS, METHOD AND PROGRAM FOR IMAGE RECEIPT, PROCESSING, CONVERSION, AND DELIVERY TO AND FROM A PLURALITY OF EXTERNAL APPARATUSES

CROSS-REFERENCE TO RELATED APPLICATIONS

This application is a continuation of application Ser. No. 11/152,383, filed Jun. 15, 2005 U.S. Pat. No. 8,237,937, which in turn is based on and claims priority to Japanese patent application No. JPAP2004-178545 filed on Jun. 16, 2004 and No. JPAP2005-166692 filed on Jun. 7, 2005 in the Japanese Patent Office, the entire contents of each of which are incorporated herein by reference.

FIELD OF THE INVENTION

The present invention relates to an apparatus, method, and program for image processing, and more particularly to an apparatus, method, and program for image processing capable of converting a format of image data into a format readable by an external device.

DESCRIPTION OF THE BACKGROUND ART

A background image processing apparatus, such as a printer and a facsimile, receives image and fax data sent from an external device. The image processing apparatus generates print image data based on the image and fax data and stores the print image data into an HDD (hard disc drive), for example. The stored print image data is subjected to gamma correction. After the gamma correction, the image processing apparatus prints an image on a transfer sheet based on the print image data.

FIG. 1 illustrates a printer 1 (i.e., the image processing apparatus) and client computers 8a and 8b (i.e., the external devices). The printer 1 includes a NIC (network interface card) 2, a printer controller 3, an HDD (hard disc drive) 4, a printer correction unit 5, and an image forming unit 6. As illustrated in FIG. 1, the printer 1 is connected to the client computers 8a and 8b via an IP (internet protocol) network 7, such as a LAN (local area network) or the Internet.

The client computers 8a and 8b can send PDL (page description language) image data via the IP network 7 to the printer 1. The PDL image data received by the printer 1 is transferred via the NIC 2 to the printer controller 3. The printer controller 3 generates print image data based on the PDL image data, and then sends the print image data to the HDD 4. The HDD 4 stores the print image data and sends the print image data to the printer correction unit 5 on demand. The printer correction unit 5 performs a print gamma correction on the print image data, and then sends the print image data to the image forming unit 6. The image forming unit 6 prints an image on a transfer sheet based on the print image data.

FIG. 2 illustrates a receiver facsimile 10 (i.e., the image processing apparatus) and a sender facsimile 16 (i.e., the external device). The receiver facsimile 10 includes a fax controller 11, an HDD (hard disc drive) 12, a printer correction unit 13, and an image forming unit 14.

The sender facsimile 16 sends fax data to the receiver facsimile 10 via a public circuit 15, for example, PSTN (public switched telephone network) or ISDN (integrated services digital network). The fax controller 11 receives and expands the fax data, if necessary, and then sends the expanded fax data to the HDD 12. The HDD 12 stores the fax data and sends the fax data to the printer correction unit 13. The printer correction unit 13 performs a print gamma correction on the fax data, and then sends the fax data to the image forming unit 14. The image forming unit 14 prints an image on a transfer sheet based on the fax data.

In the above-described image processing apparatus, however, the print image data stored in the HDD can only be used for printing or otherwise remain stored.

SUMMARY OF THE INVENTION

This specification describes a novel image processing apparatus. In one aspect, the novel image processing apparatus includes a generator, a storage, an image data format converter, and a sender. The generator generates print image data for printing an image, based on image data sent from an external device. The storage stores the print image data. The image data format converter converts the print image data into image data in a format handled by an external device in accordance with parameters determined based on at least one of property information of the print image data and property information requested by the external device. The sender sends the converted image data via an IP (Internet protocol) network to the external device.

The image data format converter may convert the print image data into image data having a color space handled by the external device.

The image data format converter may expand the print image data to convert a format of the print image data or compress the image data to send the image data to the external device.

The image data format converter may convert resolution of the print image data.

The image data format converter may perform at least one of filtering, halftone processing, density gamma conversion, and noise removal on multi-value image data generated by the generator.

When the property information of the print image data and the property information requested by the external device include a common property, a parameter for the common property may be determined based on the property information requested by the external device.

This specification further describes a novel image processing method. In another aspect, the novel image processing method includes steps of generating print image data for printing an image, based on image data sent from an external device, storing the print image data into a storage, converting the print image data into image data in a format handled by an external device, and sending the converted image data via the IP network to the external device.

This specification further describes a novel image processing program. In yet another aspect, the novel image processing program includes computer instructions for causing a computer to perform an image processing method. The method includes steps of generating print image data for printing an image, based on image data sent from an external device, storing the print image data into a storage, converting the print image data into image data in a format handled by an external device, and sending the converted image data via the IP network to the external device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is a lookup table representing compression formats and resolutions of image data stored in an HDD (hard disc drive) shown in FIG. 4;

FIG. 8 is a schematic block diagram of a functional part of an image data format converter shown in FIG. 4;

FIG. 11 is a schematic block diagram of another functional part of the image data format converter shown in FIG. 4;

FIG. 12 is a schematic block diagram of another functional part of the image data format converter shown in FIG. 4;

FIG. 19 is an illustration illustrating increasing and decreasing an MTF;

DETAILED DESCRIPTION OF THE INVENTION

Figure 1:
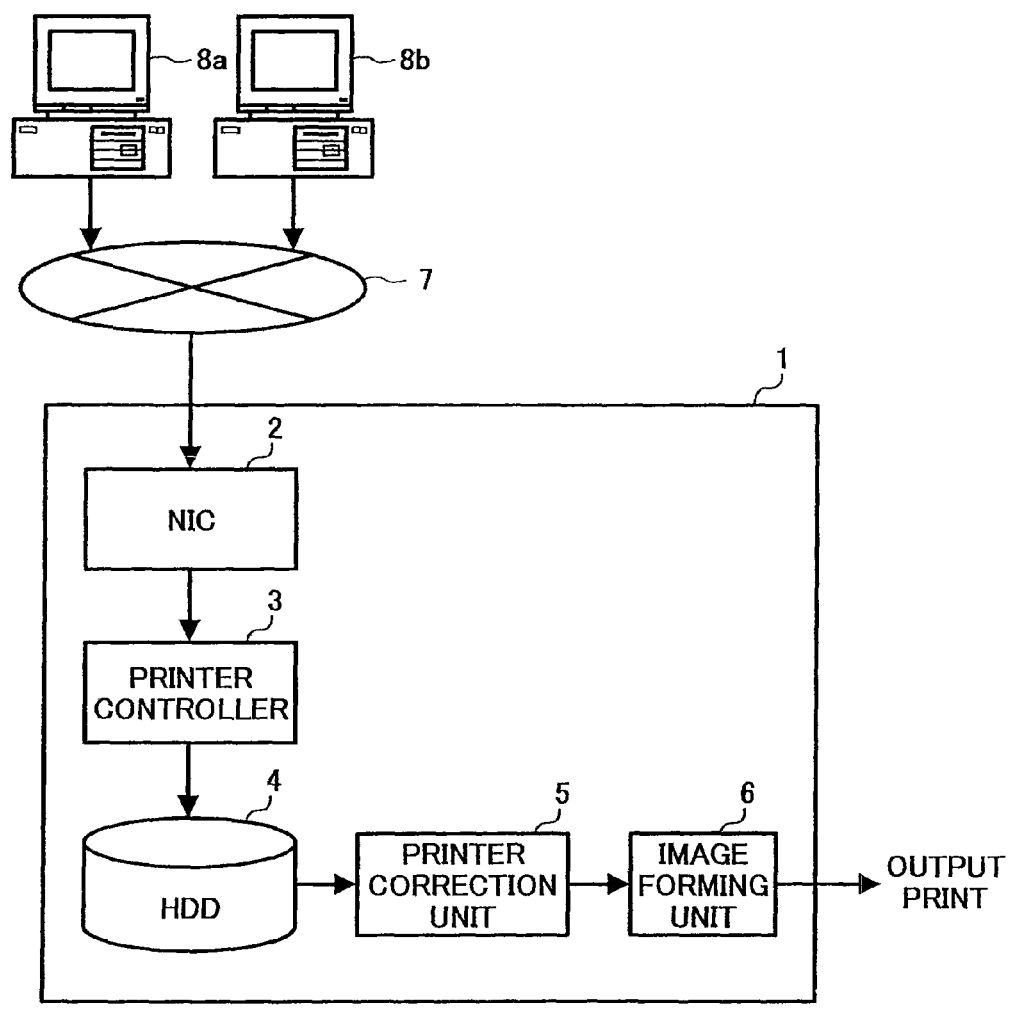
FIG. 1 is a schematic block diagram of a background image processing apparatus and external devices.
Figure 2:
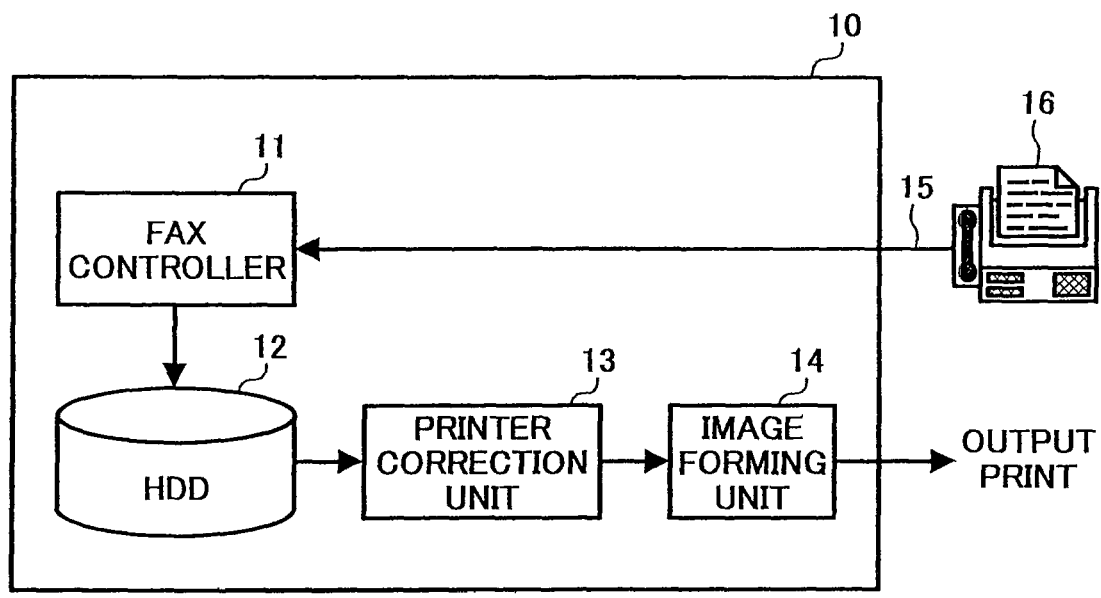
FIG. 2 is a schematic block diagram of a background image processing apparatus and an external device.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, FIGS. 3 and 4 illustrate an image processing apparatus 100 according to an exemplary embodiment of the present invention.

Figure 3:
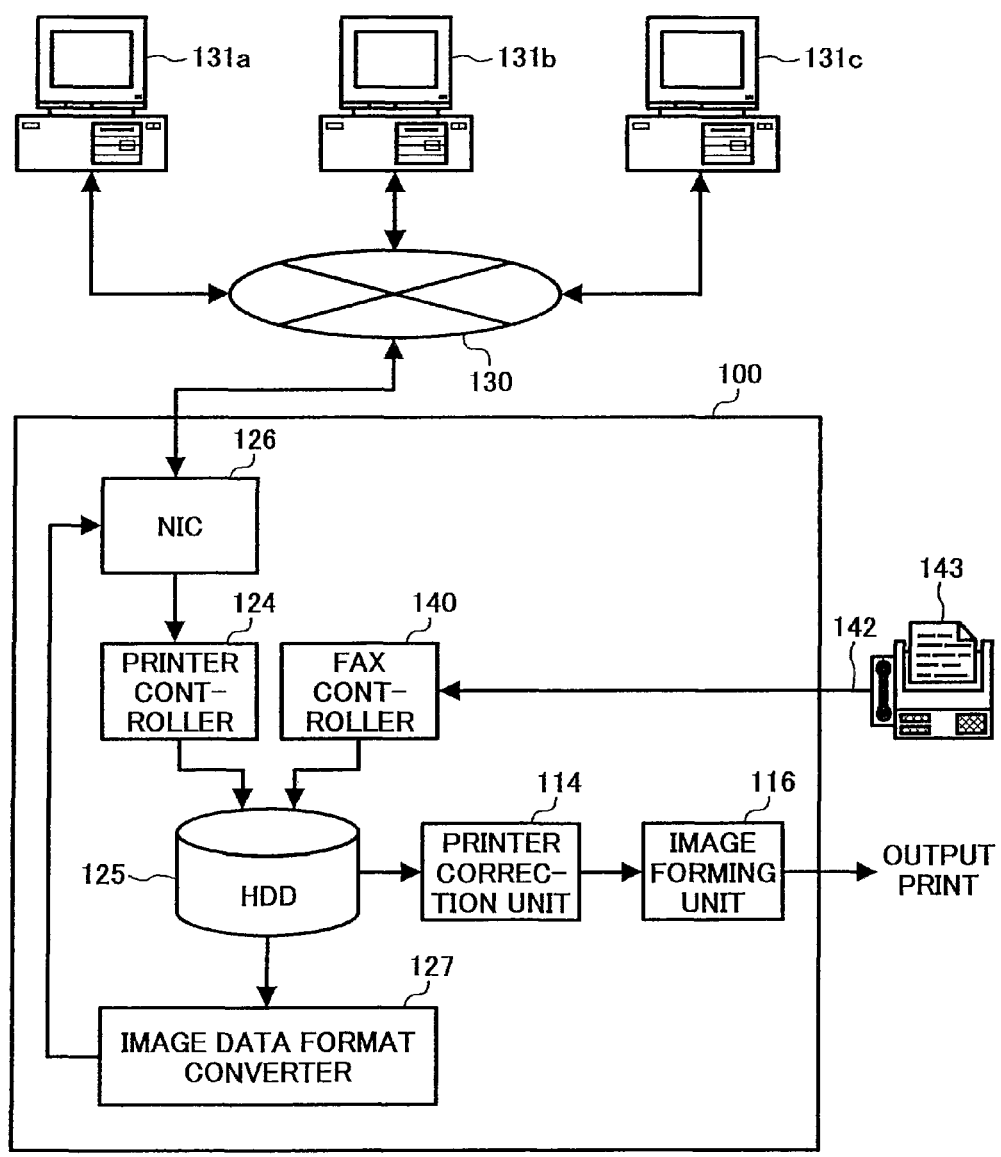
FIG. 3 is a schematic block diagram of an image processing apparatus according to an exemplary embodiment of the present invention.
Figure 4:
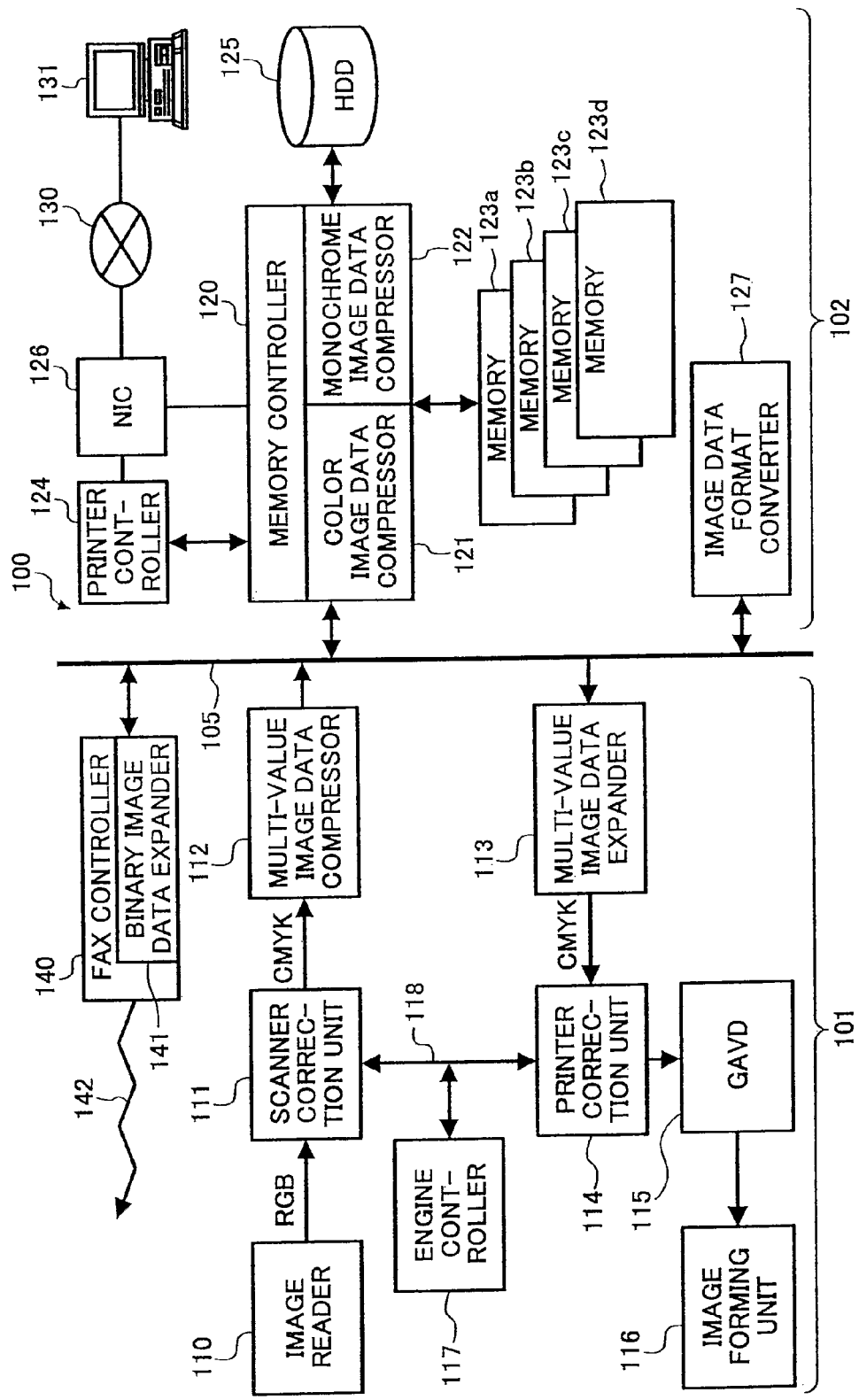
FIG. 4 is a block diagram of the image processing apparatus shown in FIG. 3.

As illustrated in FIG. 3, the image processing apparatus 100 includes a NIC (network interface card) 126, a printer controller 124, a fax controller 140, an HDD (hard disc drive) 125, a printer correction unit 114, an image forming unit 116, and an image data format converter 127. The image processing apparatus 100 is connected via a public circuit 142 to a facsimile 143, and via a network 130 to client computers 131a, 131b, and 131c.

The NIC 126 is configured to be connected to the network 130 and send image data to the client computers 131a, 131b, and 131c. The printer controller 124 is configured to generate print image data based on PDL (page description language) image data. The fax controller 140 is configured to convert image data into fax data, and then send the fax data to the facsimile 143 or convert fax data sent from the facsimile 143 into fax data in a format handled by the image processing apparatus 100. The HDD 125 is configured to store image data. The printer correction unit 114 is configured to perform a print gamma correction on image data. The image forming unit 116 is configured to print an image on a transfer sheet. The image data format converter 127 is configured to perform filtering, gamma conversion, and compression on the image data sent from the HDD 125 based on image processing information. The public circuit 142 is configured to carry fax data. The facsimile 143 is configured to function as an external device for sending and receiving fax data to and from the fax controller 140. The network 130 is configured to include an IP (Internet protocol) network for carrying image data to and from the client computers 131a, 131b, and 131c. The client computers 131a, 131b, and 131c are configured to function as external devices for sending and receiving image data. An administrator operates the client computer 131c to manage the client computers 131a and 131b.

The client computer 131a sends PDL image data to the image processing apparatus 100 via the network 130. For example, the PDL image data may include image or text data in a generic or device specific format the image processing apparatus 100 may handle. The PDL image data received by the image processing apparatus 100 is transferred via the NIC 126 to the printer controller 124.

The printer controller 124 performs image processing on the PDL image data. The image processing generates print image data based on the PDL image data. The print image data includes CMYK (cyan, magenta, yellow, and black) image data. The printer controller 124 sends the print image data to the HDD 125.

The facsimile 143 sends compressed fax data via the public circuit 142 to the fax controller 140. The fax controller 140 expands the compressed fax data if necessary, generates print image data, and then sends the print image data to the HDD 125.

The HDD 125 stores the print image data sent from the printer controller 124 and the fax controller 140. The HDD 125 sends the print image data to the printer correction unit 114. The printer correction unit 114 performs a print gamma correction on the print image data, and then sends the print image data to the image forming unit 116. The image forming unit 116 prints an image on a transfer sheet.

The HDD 125 may send the print image data to the image data format converter 127. The image data format converter 127 converts the print image data into image data in a format corresponding to image data properties handled by the client computer 131*c*. The image data properties include size and type of image data. The image data format converter 127 converts the print image data into image data in a generic format handled by an application installed in the client computer 131*c*. The generic formats include JPEG (joint photographic experts group), TIFF (tagged image file format), and GIF (graphics interchange format). When compressing the print image data to send it to the client computer 131*c*, not to print an image, the image data format converter 127 may compress the print image data into small-size image data or may convert color print image data into monochrome image data, if necessary. The image data format converter 127 may also convert CMYK print image data into RGB image data.

The image data format converter 127 sends the converted image data to the NIC 126. The NIC 126 sends the image data to the client computer 131*b* or 131*c*.

Thus, the client computer 131*c* may share and browse the image data equivalent to the print image data stored in the HDD 125. The client computer 131*c* extracts the image data from the image processing apparatus 100. Therefore, the client computer 131*c* may browse the image data which has been sent from the client computer 131*a* or the facsimile 143. The client computers 131*b* and 131*c* may edit the image data sent from the image processing apparatus 100.

A control panel (not shown) may specify in advance a format handled by the client computer 131*b* or 131*c*. The image data format converter 127 may convert the print image data into image data in a format requested by the client computer 131*c*.

The image data format converter 127 may convert the print image data stored in the HDD 125 into image data in a format requested by the client computer 131*a*, 131*b*, or 131*c*, and then send the converted image data to the client computer 131*a*, 131*b*, or 131*c*. The plurality of the client computers 131*a*, 131*b*, and 131*c* may share the image data. Thus, the image data may be utilized. The image data format converter 127 converts the print image data into image data in a generic format handled by the client computer 131*a*, 131*b*, or 131*c*, and then sends the converted image data to the client computer 131*a*, 131*b*, or 131*c*. Thus, the client computer 131*a*, 131*b*, or 131*c* may easily browse or edit the image data.

As illustrated in FIG. 4, the image processing apparatus 100 includes an engine section 101, a printer controller section 102, and a global bus 105. The image processing apparatus 100 is connected to the public circuit 142, the network 130, and a client computer 131. The client computer 131 executes an image processing program stored in a memory (not shown), so that the image processing apparatus 100 performs processing described below.

The engine section 101 includes an image reader 110, a scanner correction unit 111, a multi-value image data compressor 112, a multi-value image data expander 113, the printer correction unit 114, a GAVD (gate array video driver) 115, the image forming unit 116, a CPU bus 118, an engine controller 117, and the fax controller 140 including a binary image data expander 141.

The printer controller section 102 includes a memory controller 120 including a color image data compressor 121 and a monochrome image data compressor 122, memories 123*a*, 123*b*, 123*c*, and 123*d*, the printer controller 124, the HDD 125, the NIC 126, and the image data format converter 127.

The engine section 101 is configured to include various devices for inputting, processing, and outputting an image and image data. The printer controller section 102 is configured to include various devices for inputting, processing, and outputting print image data. The global bus 105 is configured to connect devices in the engine section 101 and the printer controller section 102. The client computer 131 is configured to function as an external device for sending and receiving image data.

The image reader 110 is configured to scan an image including text and photograph on an original, convert the scanned image into RGB image data (i.e., image data containing red, green, and blue color image data), and then send the RGB image data to the scanner correction unit 111. The scanner correction unit 111 is configured to perform scanner gamma processing, filtering, color correction, and reducing and enlarging on the RGB image data sent from the image reader 110, and then send the processed image data to the multi-value image data compressor 112. The multi-value image data compressor 112 is configured to perform fixed-length compression on the processed image data sent from the scanner correction unit 111. The multi-value image data expander 113 is configured to perform fixed-length expansion on the compressed image data, and then send the expanded image data to the printer correction unit 114. The GAVD 115 is configured to control an LD (laser diode) in the image forming unit 116 based on the processed image data sent from the printer correction unit 114. The CPU bus 118 is configured to connect the scanner correction unit 111 with the printer correction unit 114. The engine controller 117 is configured to control the scanner correction unit 111 and the printer correction unit 114. The binary image data expander 141 is configured to expand monochrome image data that is subjected to lossless variable-length compression.

The memory controller 120 is configured to be connected with the printer controller 124, and send and receive image data to and from the global bus 105 or the NIC 126. The color image data compressor 121 is configured to perform lossless variable-length compression on color image data. The monochrome image data compressor 122 is configured to perform lossless variable-length compression on monochrome image data. The memories 123*a*, 123*b*, 123*c*, and 123*d* are configured to form independent memories for storing print image data in CMYK colors so that the image forming unit 116 forms an image based on the print image data in the CMYK colors.

Figure 5:
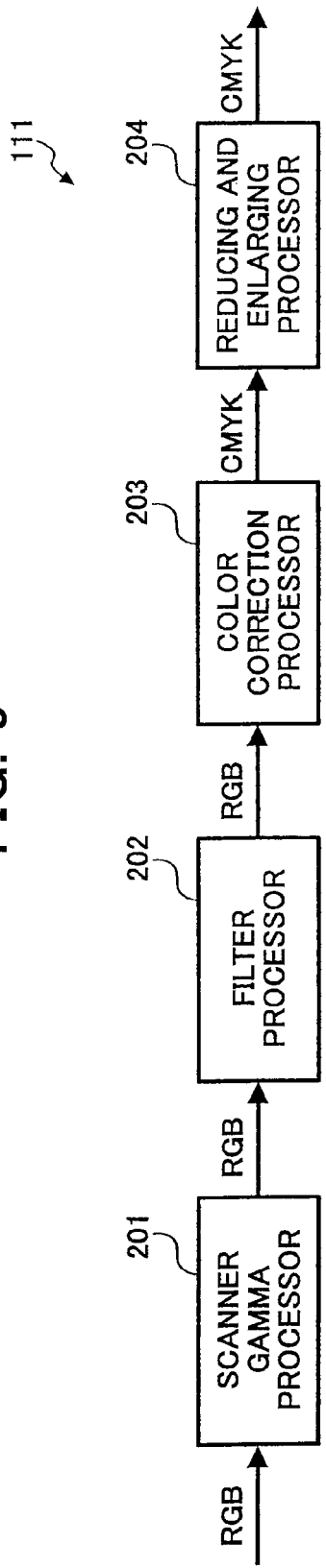
FIG. 5 is a schematic block diagram of a scanner correction unit shown in FIG. 4.

As illustrated in FIG. 5, the scanner correction unit 111 includes a scanner gamma processor 201, a filter processor 202, a color correction processor 203, and a reducing and enlarging processor 204.

The scanner gamma processor 201 is configured to perform scanner gamma processing on the RGB image data sent from the image reader 110, and then send the processed image data to the filter processor 202. The filter processor 202 is configured to include various filters, perform filtering on the RGB image data sent from the scanner gamma processor 201, and then send the processed image data to the color correction processor 203. The color correction processor 203 is configured to perform color correction on the RGB image data sent from the filter processor 202, convert the RGB image data into CMYK image data, and then send the CMYK image data to the reducing and enlarging processor 204. The reducing and enlarging processor 204 is configured to perform reducing or enlarging on the CMYK image data sent from the color correction processor 203, and then send the processed image data to the multi-value image data compressor 112.

Figure 6:
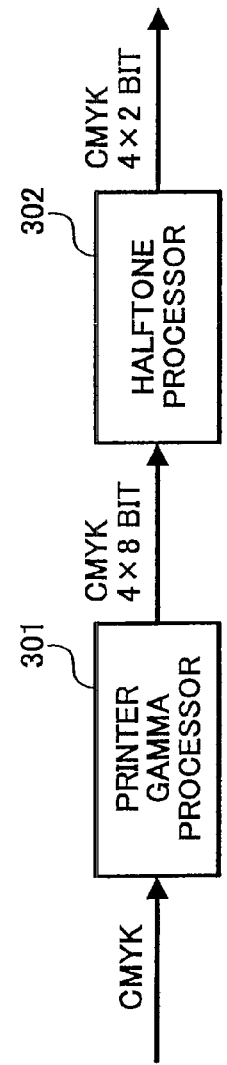
FIG. 6 is a schematic block diagram of a printer correction unit shown in FIG. 4.

As illustrated in FIG. 6, the printer correction unit 114 includes a printer gamma processor 301 and a halftone processor 302.

The printer gamma processor 301 is configured to perform printer gamma processing on the expanded CMYK image data sent from the multi-value image data expander 113 to generate 8-bit image data for each of the CMYK colors, and then send the 8-bit image data to the halftone processor 302. The halftone processor 302 is configured to perform halftone processing on the 8-bit image data sent from the printer gamma processor 301 to generate 2-bit image data for each of the CMYK colors, and then send the 2-bit image data to the GAVD 115.

Referring to FIG. 4, copying operations are explained. The image reader 110 scans an image on an original, converts the scanned image into RGB image data, and then sends the RGB image data to the scanner correction unit 111. The scanner correction unit 111 performs scanner gamma processing, filtering, color correction, and reducing and enlarging on the RGB image data sent from the image reader 110 to generate CMYK image data, and then sends the processed image data to the multi-value image data compressor 112.

The multi-value image data compressor 112 performs fixed-length compression on the processed image data sent from the scanner correction unit 111. Namely, the multi-value image data compressor 112 compresses the 8-bit image data into n-bit image data. "n" is not greater than eight. The compressed image data is sent via the global bus 105 to the memory controller 120. The memory controller 120 stores the compressed CMYK image data into the memories 123a, 123b, 123c, and 123d. The stored image data is written into the HDD 125 as needed. Thus, it is not necessary to scan the image on the original again, even if the image is not properly printed due to paper jam. Further, the image may be reprinted when necessary by using the stored image data.

The compressed image data stored in the memories 123a, 123b, 123c, and 123d is sent via the global bus 105 to the multi-value image data expander 113. The multi-value image data expander 113 expands the compressed image data into 8-bit image data, and then sends the expanded image data to the printer correction unit 114. The printer correction unit 114 performs printer gamma processing and halftone processing on the expanded image data sent from the multi-value image data expander 113, and then sends the processed image data to the GAVD 115.

The GAVD 115 sends a signal for controlling the LD in the image forming unit 116 based on the processed image data sent from the printer correction unit 114 to the image forming unit 116. The image forming unit 116 forms an image by using a light scanning device (not shown) including the LD which is controlled by the signal sent from the GAVD 115.

If the image data is formed of monochrome image data, the color correction processor 203 illustrated in FIG. 5 converts the RGB image data into 8-bit grayscale image data. The multi-value image data compressor 112 compresses the converted image data, and then sends the compressed image data via the global bus 105 to the memory controller 120. The compressed image data is stored into the memory 123d for storing black color image data. The compressed grayscale image data is stored into the HDD 125.

When the client computer 131 sends a request to print an image by using the image data stored in the HDD 125, low-bit RIP (raster image processing) image data (i.e., 1-bit to 4-bit RIP image data) for each of the CMYK colors is created for color printing. 1-bit RIP image data for the black color is created for monochrome printing.

The color image data compressor 121 and the monochrome image data compressor 122 respectively compress the RIP image data for the CMYK colors and the RIP image data for the black color. Thus, the compressed image data may be stored into the memories 123a, 123b, 123c, and 123d without occupying substantial space in the memories 123a, 123b, 123c, and 123d. The compressed image data is stored into the HDD 125. Resolution for printing is set to 300 dpi, 600 dpi, or 1,200 dpi.

To send a fax, the fax controller 140 stores binary image data that is subjected to binary lossless variable-length compression. Resolution for sending a fax is set to 200 dpi, 300 dpi, or 400 dpi.

As described above, the image processing apparatus 100 includes image data compressed in various formats and having various resolutions. The HDD 125 stores those image data.

FIG. 7 illustrates compression formats and resolutions of the stored image data for color copying, monochrome copying, color printing, monochrome printing, and faxing.

Figure 9:
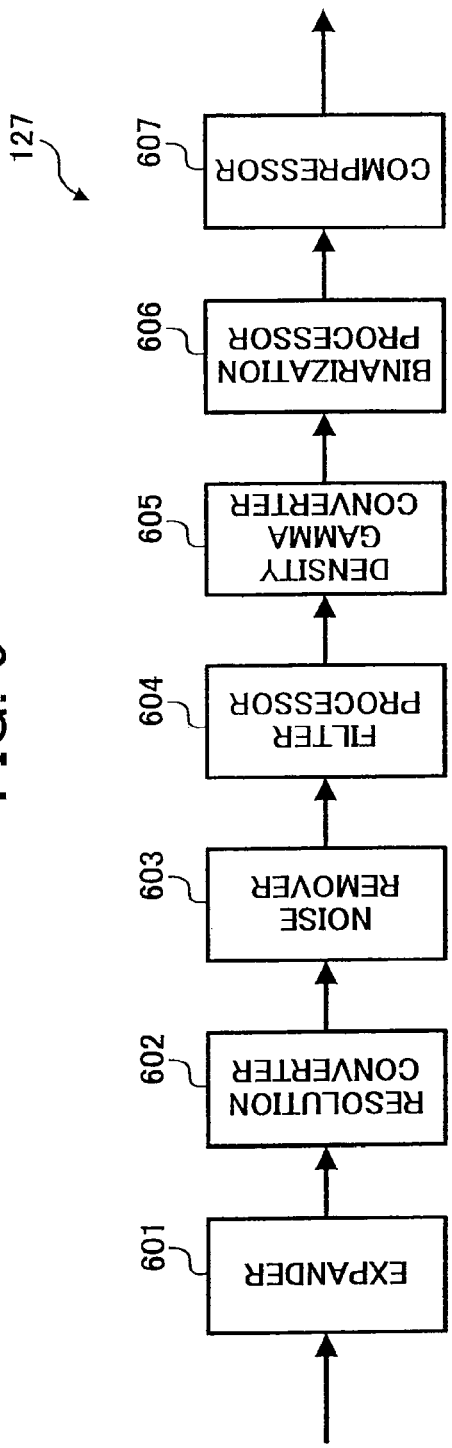
FIG. 9 is a schematic block diagram of another functional part of the image data format converter shown in FIG. 4.

Referring to FIGS. 8 and 9 operations for sending the image data stored in the HDD 125 via the network 130 to the client computer 131 are explained. As described above, the HDD 125 stores the image data in various formats. If the image data is sent to the client computer 131 without being converted, the client computer 131 may not read the image data. To avoid this, the image data format converter 127 converts the format of the image data, which is specific to a certain device in the image processing apparatus 100, into a generic format.

As illustrated in FIG. 8, the image data format converter 127 includes a binary image data expander 501 and an MHMR/MMR compressor 502.

The binary image data expander 501 is configured to expand image data compressed in a device specific format, and then send the expanded image data to the MHMR/MMR compressor 502. The MHMR/MMR compressor 502 is configured to compress the expanded image data sent from the binary image data expander 501 into image data in an MHMR/MMR format.

The client computer 131 requests image data and its format. If the client computer 131 requests monochrome image data in a generic format (i.e., a binary compression format), but the monochrome image data stored in the HDD 125 is compressed in a device specific format (i.e., a binary variable-length compression format), the binary image data expander 501 expands the monochrome image data, and then sends the expanded image data to the MHMR/MMR compressor 502. The MHMR/MMR compressor 502 compresses the expanded image data into image data in the MHMR/MMR format, that is, the generic format. A header in a predetermined TIFF format is added to the compressed image data. Then, the compressed image data is sent via the NIC 126 and the network 130 to the client computer 131.

As illustrated in FIG. 9, the image data format converter 127 further includes an expander 601, a resolution converter 602, a noise remover 603, a filter processor 604, a density gamma converter 605, binarization processor 606, and a compressor 607.

The expander 601 is configured to expand compressed image data. The resolution converter 602 is configured to change the resolution of the expanded image data. The noise remover 603 is configured to remove noise. The filter processor 604 is configured to perform emphasis filtering. The density gamma converter 605 is configured to perform density gamma conversion. The binarization processor 606 is configured to perform binarization. The compressor 607 is configured to compress the binarized image data.

If the client computer 131 requests monochrome image data at a resolution lower by half than an original resolution, the expander 601 expands the compressed monochrome image data, and then sends the expanded monochrome image data to the resolution converter 602. The resolution converter 602 lowers the resolution of the expanded monochrome image data by half, for example, from 600 dpi into 300 dpi, and then sends the monochrome image data to the noise remover 603. The noise remover 603 removes noise from the monochrome image data, and then sends the monochrome image data to the filter processor 604. The filter processor 604 performs emphasis filtering on the monochrome image data at a requested level, and then sends the processed monochrome image data to the density gamma converter 605. The density gamma converter 605 performs density gamma conversion on the processed monochrome image data, and then sends the converted monochrome image data to the binarization processor 606. The binarization processor 606 performs binarization on the converted monochrome image data by using a binarization algorithm such as error diffusion, and then sends the processed monochrome image data to the compressor 607. The compressor 607 performs G3 compression on the binarized monochrome image data. Then, the compressed monochrome image data is sent via the NIG 126 to the client computer 131.

Thus, before the image data stored in the HDD 125 is sent to the client computer 131, the client computer 131 sends specification information about the requested image data to the image processing apparatus 100. The specification information includes resolution, noise removal, filtering type, gamma conversion type, binarization type, and generic compression format. The image processing apparatus 100 performs proper processing on the requested image data based on the specification information, and then sends the processed image data to the client computer 131.

The specification information is sent in a generic format such as XML. The specification information includes parameters for resolution, filtering type, gamma conversion type, and the like. The image data format converter 127 performs various processing in accordance with the parameters.

Figure 10:
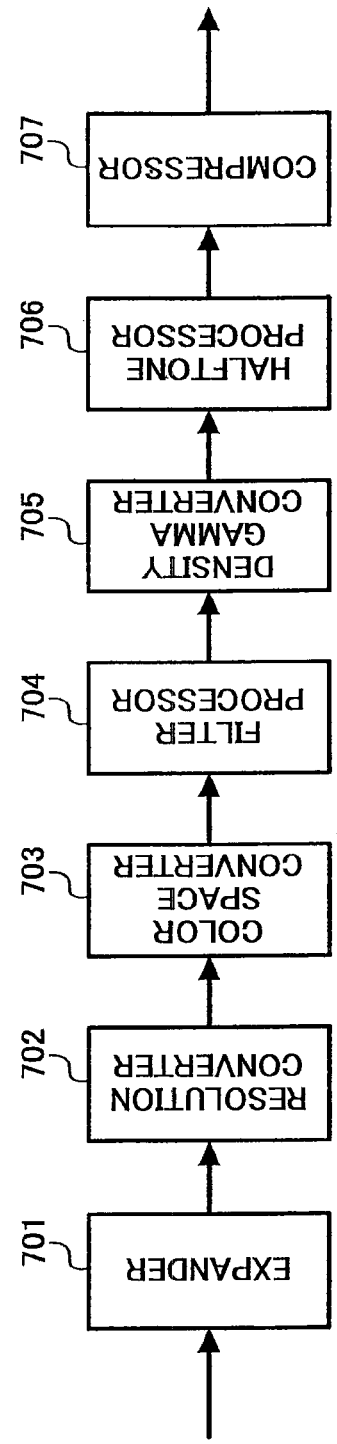
FIG. 10 is a schematic block diagram of another functional part of the image data format converter shown in FIG. 4.

Referring to FIG. 10, printing operations based on a request from the client computer 131 are explained. The memory controller 120 performs RIP processing on image data to generate RIP image data, that is, 8-bit RGB image data. The color image data compressor 121 and the monochrome image data compressor 122 respectively compress the RIP image data. Then, the compressed image data is stored into the HDD 125 to avoid occupying substantial space in the memories 123a, 123b, 123c, and 123d.

The image data stored in the HDD 125 may be sent to the client computer 131, so that the client computer 131 reads and processes the image data. However, it is necessary to convert the resolution and color space of the image data into those specified by the client computer 131.

As illustrated in FIG. 10, the image data format converter 127 includes an expander 701, a resolution converter 702, a color space converter 703, a filter processor 704, a density gamma converter 705, a halftone processor 706, and a compressor 707.

The expander 701 is configured to expand the image data stored in the HDD 125. The resolution converter 702 is configured to perform resolution conversion. The color space converter 703 is configured to perform color space conversion. The filter processor 704 is configured to perform filtering. The density gamma converter 705 is configured to perform density gamma conversion. The halftone processor 706 is configured to perform halftone processing. The compressor 707 is configured to compress the processed image data into image data in a format specified by the client computer 131.

The expander 701, the resolution converter 702, the filter processor 704, the density gamma converter 705, and the compressor 707 may be respectively identical with the expander 601, the resolution converter 602, the filter processor 604, the density gamma converter 605, and the compressor 607.

The expander 701 expands the image data stored in the HDD 125, and then sends the expanded image data to the resolution converter 702. The resolution converter 702 performs resolution conversion on the expanded image data, and then sends the converted image data to the color space converter 703. The color space converter 703 performs color space conversion on the resolution converted image data unless the image data is monochrome image data, and then sends the converted image data to the filter processor 704. The filter processor 704 performs filtering on the converted image data, and then sends the processed image data to the density gamma converter 705. The density gamma converter 705 performs density gamma conversion on the processed image data, and then sends the converted image data to the halftone processor 706. The halftone processor 706 performs halftone processing on the converted image data, and then sends the processed image data to the compressor 707. The compressor 707 compresses the processed image data into image data in a format specified by the client computer 131.

Figure 13:
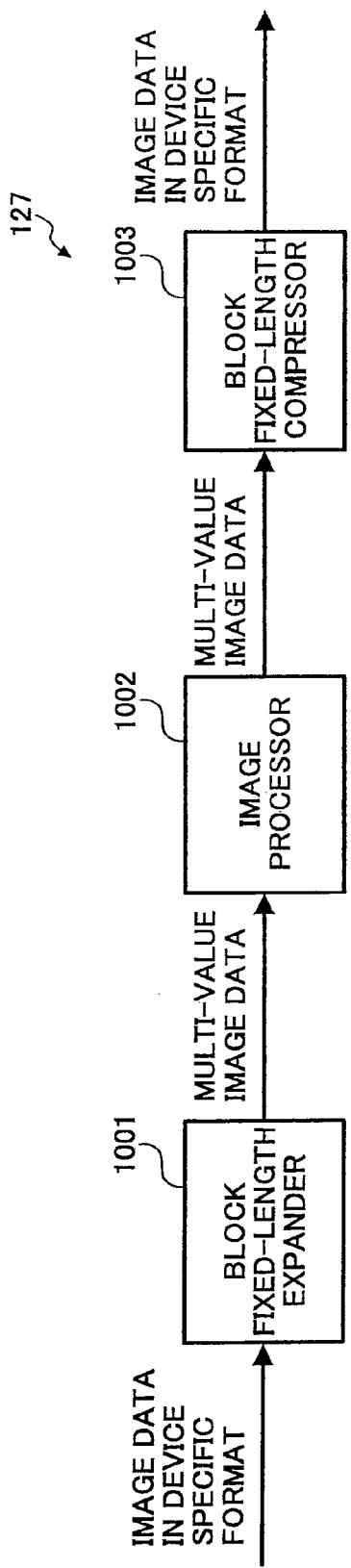
FIG. 13 is a schematic block diagram of another functional part of the image data format converter shown in FIG. 4.

Referring to FIGS. 11 to 13, operations of the image data format converter 127 for converting format of the image data are explained. Formats of the image data include various types. Those types are categorized into a generic format and a device specific format. The generic format may be handled in any device. The device specific format may be handled only in a certain device. When a device sends image data in the generic format to other device, both devices may handle the image data. On the other hand, when a device sends image data in the device specific format to other device, the other device may not handle the image data unless the image data is converted into image data in a format handled by the device. However, image data processing may be effectively performed in the device which may handle the device specific format. Thus, by converting between the generic format and the device specific format, image data may be effectively used.

As illustrated in FIG. 11, the image data format converter 127 performs image processing on color image data in a generic format (i.e., a JPEG format), compresses the processed image data into image data in the generic format (i.e., the JPEG format) again, and then sends the converted image data to the client computer 131.

The image data format converter 127 further includes a JPEG expander 801, an image processor 802, and a JPEG compressor 803.

The JPEG expander 801 is configured to expand image data compressed in the JPEG format. The image processor 802 is configured to perform image processing on the expanded data. The JPEG compressor 803 is configured to compress the processed image data into image data in the JPEG format.

The JPEG expander 801 expands image data compressed in the JPEG format, and then sends the expanded image data to the image processor 802. The image processor 802 performs image processing on the expanded image data based on the specification information about resolution and the like specified by the client computer 131, and then sends the processed image data to the JPEG compressor 803. The JPEG compressor 803 compresses the processed image data into image data in the JPEG format, and then sends the compressed image data to outside of the image data format converter 127.

As illustrated in FIG. 12, the image data format converter 127 performs expansion and image processing on color image data in a device specific format (i.e., a block fixed-length compression format), converts the processed image data into image data in the generic format (i.e., the JPEG format), and then sends the converted image data to the client computer 131. The block fixed-length compression format may maintain efficiency in compression and data processing.

The image data format converter 127 further includes a block fixed-length expander 901, an image processor 902, and a JPEG compressor 903.

The block fixed-length expander 901 is configured to expand image data compressed in the block fixed-length compression format. The image processor 902 is configured to perform image processing on the expanded image data. The JPEG compressor 903 is configured to compress the processed image data into image data in the JPEG format.

The JPEG compressor 903 may be identical with the JPEG compressor 803.

The block fixed-length expander 901 expands image data compressed in the block fixed-length compression format, and then sends the expanded image data to the image processor 902. The image processor 902 performs image processing on the expanded image data based on the specification information specified by the client computer 131, and then sends the processed image data to the JPEG compressor 903. The JPEG compressor 903 compresses the processed image data into image data in the JPEG format, and then sends the compressed image data to outside of the image data format converter 127.

Before being sent to the client computer 131, the image data is compressed in the block fixed-length compression format, that is, a format specific to the image processing apparatus 100. Thus, change in compression rate of the image data may be effectively managed. Further, the image data is divided into blocks. Therefore, images may be easily rotated and sorted.

Thus, by using the generic format such as the standardized JPEG format, devices may send and receive image data in a uniform format. Further, it is possible to configure a data format conversion system for maintaining both image quality, and data transmission and reception efficiency. Binary image data may use a generic compression format such as the MHMR/MMR format.

As illustrated in FIG. 13, the image data format converter 127 performs expansion and image processing on color image data in the device specific format (i.e., the block fixed-length compression format), compresses the processed image data into image data in the device specific format (i.e., the block fixed-length compression format), and then sends the converted image data to the client computer 131.

The image data format converter 127 further includes a block fixed-length expander 1001, an image processor 1002, and a block fixed-length compressor 1003.

The block fixed-length expander 1001 is configured to expand image data compressed in the block fixed-length compression format. The image processor 1002 is configured to perform image processing on the expanded image data. The block fixed-length compressor 1003 is configured to compress the processed image data into image data in the block fixed-length compression format.

The block fixed-length expander 1001 may be identical with the block fixed-length expander 901. The image processor 1002 may be identical with the image processor 802 and the image processor 902.

The block fixed-length expander 1001 expands image data compressed in the block fixed-length compression format, and then sends the expanded image data to the image processor 1002. The image processor 1002 performs image processing on the expanded image data based on the specification information specified by the client computer 131, and then sends the processed image data to the block fixed-length compressor 1003. The block fixed-length compressor 1003 compresses the processed image data into image data in the block fixed-length compression format, and then sends the compressed image data to outside of the image data format converter 127.

In this case, a receiver device needs to be capable of handling the device specific format. However, sending and receiving the image data in the device specific format may improve compression rate and efficiency in sending and receiving the image data more than in the generic format.

To send image data to an external device including the client computer 131, the image data format converter 127 performs various image processing based on the specification information specified by the external device, resulting in improved availability of the image data.

Referring to FIGS. 14 to 26, various image processing performed by the image data format converter 127 is explained.

To convert binary image data into 256-value image data by using a multi-value conversion function, space filtering is performed by referring to pixels surrounding a 1-bit target pixel on a two-dimensional matrix. The binary image data is converted into 8-bit image data based on a calculation 0X00 when a value of the target pixel is zero or a calculation 0XFF when a value of the target pixel is one. Filtering calculation is performed based on a coefficient matrix (1) and an equation (2) below.

$$[x, y] = \begin{Bmatrix} 1, 2, 3, 4, 3, 2, 1, \\ 2, 3, 7, 8, 7, 4, 2, \\ 3, 7, 9, 11, 9, 7, 3, \\ 2, 3, 7, 8, 7, 4, 2, \\ 1, 2, 3, 4, 3, 2, 1, \end{Bmatrix} \quad (1)$$

In the above coefficient matrix (1), "x" and "y" indicate filtering coefficients.

$$[i, j] = 1/256 \sum_{x=-j}^{J} \sum_{y=-j}^{J} ([x, y] \times [i + x, j + y]) \quad (2)$$

In the above equation (2), "i" and "j" indicate 256-value image data. "x" and "y" indicate filtering coefficients. "i+x" and "j+y" indicate pixel data.

Figure 14:
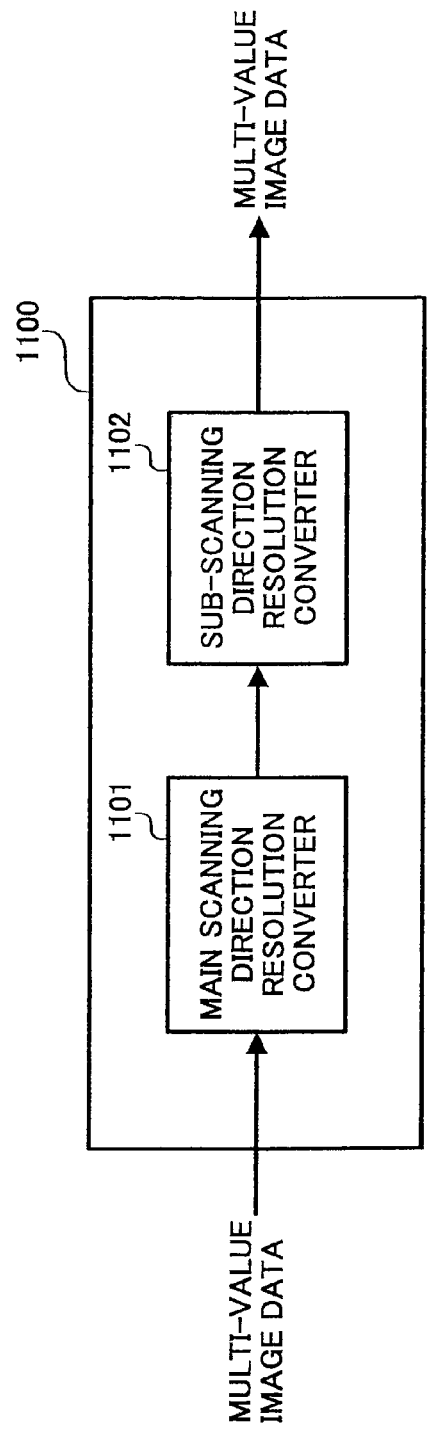
FIG. 14 is a schematic block diagram of a resolution converter of the image data format converter shown in FIG. 4.
Figure 15:
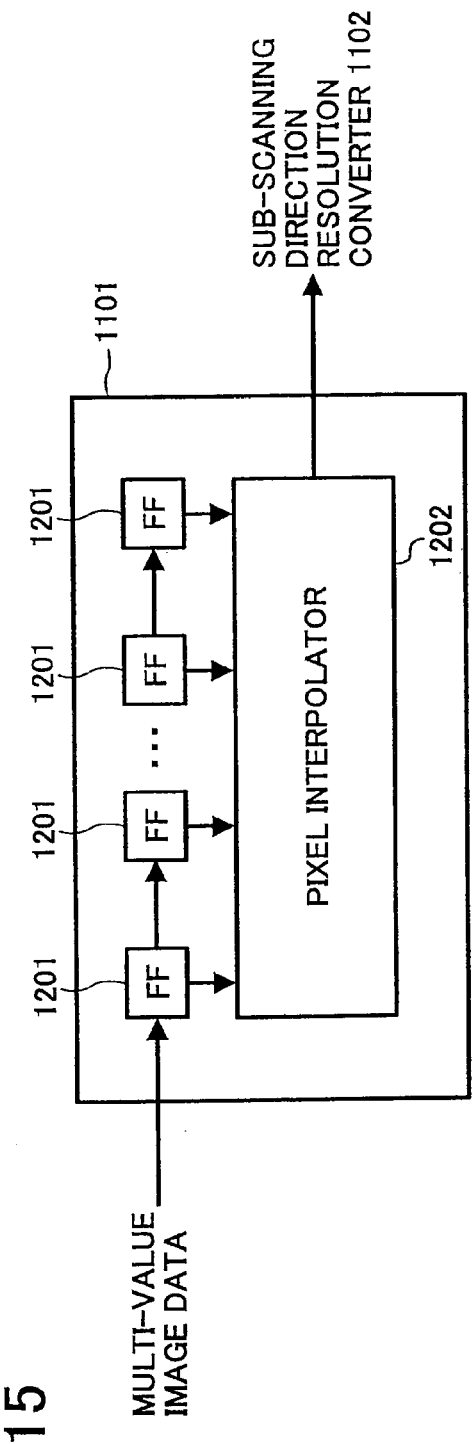
FIG. 15 is a schematic block diagram of a main scanning direction resolution converter shown in FIG. 14.
Figure 16:
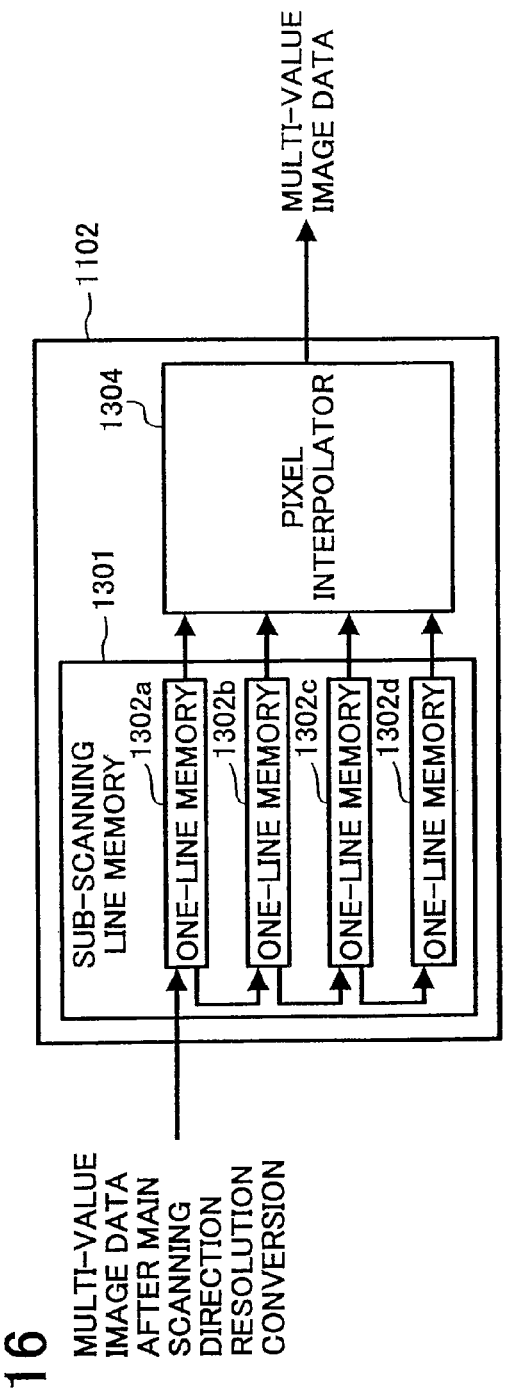
FIG. 16 is a schematic block diagram of a sub-scanning direction resolution converter shown in FIG. 14.

Referring to FIGS. 14 to 16, operations for resolution conversion are explained. As illustrated in FIG. 14, the image data format converter 127 further includes a resolution converter 1100. The resolution converter 1100 includes a main scanning direction resolution converter 1101 and a sub-scanning direction resolution converter 1102.

The resolution converter 1100 is configured to perform resolution conversion on image data. The main scanning direction resolution converter 1101 is configured to perform resolution conversion in a main scanning direction. The sub-scanning direction resolution converter 1102 is configured to perform resolution conversion in a sub-scanning direction.

To perform resolution conversion on multi-value image data in both the main scanning and sub-scanning directions, the main scanning direction resolution converter 1101 performs resolution conversion in the main scanning direction on the multi-value image data, and then sends the converted image data to the sub-scanning direction resolution converter 1102. The sub-scanning direction resolution converter 1102 performs resolution conversion in the sub-scanning direction on the converted image data sent from the main scanning direction resolution converter 1101, and then sends the converted image data to outside of the resolution converter 1100.

As illustrated in FIG. 15, the main scanning direction resolution converter 1101 includes FF (flip-flop) circuits 1201 and a pixel interpolator 1202.

The FF circuits 1201 are configured to store the multi-value image data. The pixel interpolator 1202 is configured to perform pixel interpolation in the main scanning direction on the multi-value image data.

The pixel interpolator 1202 performs pixel interpolation in the main scanning direction on the multi-value image data to convert a value of the image data into a specified resolution, and then sends the converted image data to the sub-scanning direction resolution converter 1102. To calculate the value of pixel data to be interpolated, nearest pixel conversion, adjacent two-pixels weighted averaging, and cubic convolution may be used.

As illustrated in FIG. 16, the sub-scanning direction resolution converter 1102 includes a sub-scanning line memory 1301 including one-line memories 1302a, 1302b, 1302c, and 1302d, and a pixel interpolator 1304.

The sub-scanning line memory 1301 is configured to store the multi-value image data of which resolution is converted in the main scanning direction. The one-line memories 1302a, 1302b, 1302c, and 1302d are configured to store the multi-value image data per line. The pixel interpolator 1304 is configured to calculate the value of pixel data to be interpolated based on reference pixel data in the sub-scanning direction and perform pixel interpolation.

To calculate the value of pixel data to be interpolated, nearest pixel conversion, adjacent two-pixels weighted averaging, and cubic convolution may be used.

As described above, the resolution converter 1100 converts the multi-value image data in the main scanning and sub-scanning directions at an arbitrary resolution. The value of pixel data to be interpolated may be calculated in a predetermined method by referring to surrounding multi-value pixel data to perform resolution conversion for suppressing texture.

Figure 17:
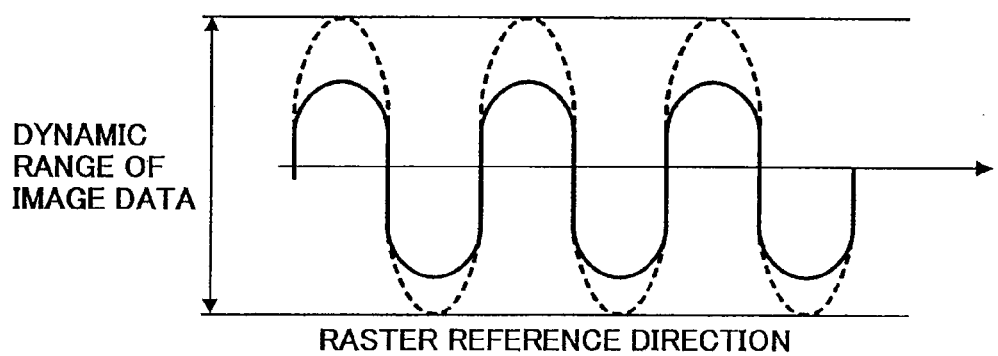
FIG. 17 is a graph illustrating waveforms of image data before and after filtering.
Figure 18:
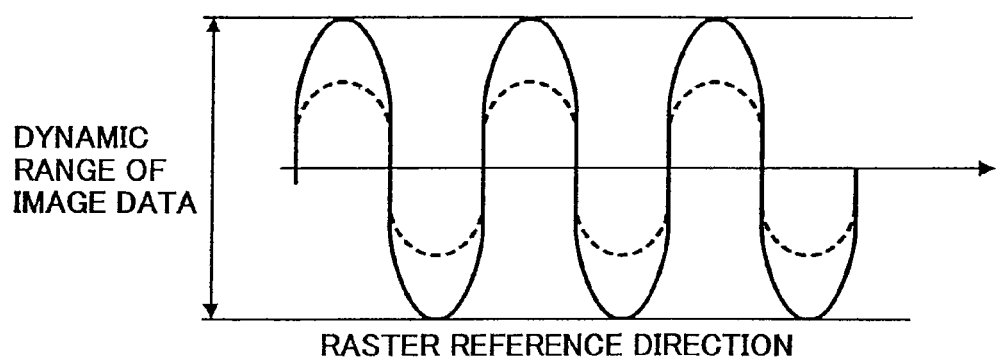
FIG. 18 is a graph illustrating waveforms of image data before and after filtering.

Referring to FIGS. 17 to 19, filtering operations are explained. Filtering modulates an MTF (modulation transfer function) of image data. The MTF is increased to emphasize edges of an image or decreased to smooth the image.

FIG. 17 illustrates waveforms of image data before and after increasing the MTF. FIG. 18 illustrates waveforms of image data before and after decreasing the MTF. The waveforms of image data before filtering are illustrated in solid lines. The waveforms of image data after filtering are illustrated in broken lines. A vertical axis shows a dynamic range of image data. A horizontal axis shows a raster reference direction of image data.

To increase the MTF, filtering emphasizes ridges of the waveforms of the image data, as illustrated in FIG. 17. To decrease the MTF, filtering suppresses ridges of the waveforms of the image data, as illustrated in FIG. 18.

FIG. 19 illustrates increasing and decreasing the MTF. X-axis shows the raster reference direction of two-dimensional image data. Y-axis shows the other direction. The image data is handled per line. A value of a target pixel is calculated based on values of surrounding pixels. The value of a target pixel 1601 is indicated by "$X_{m,n}$". The values of surrounding 5×5 pixels are indicated based on "$X_{m,n}$".

To increase the MTF, differential coefficients of waveforms to be emphasized are calculated. The differential coefficients (i.e., matrix coefficients) are arranged as matrices based on resolution of image data. When the matrix coefficients are indicated by $A_{m-2,n-2}$, $A_{m-2,n-1}$, ..., $A_{m,n}$, $A_{m+2,n+1}$, and $A_{m+2,n+2}$, a target pixel value Y after filtering to increase the MTF is calculated by an equation (5) below:

$$B = (X_{m-2,n-2} X A_{m-2,n-2}) + (X_{m-2,n-1} X A_{m-2,n-1}) + \ldots + (X_{m+2,n+2} X A_{m+2,n+2}) \quad (3)$$

$$D = B X C \quad (4)$$

$$Y = D + X_{m,n} \quad (5)$$

An equation (3) indicates product of matrices obtained by multiplying the pixel value of image data by the matrix coefficient. A value B indicates an emphasis component. An equation (4) is used for arbitrarily increasing or decreasing the emphasis component. An emphasis value D is obtained by the equation (4). The emphasis value D is added to a target pixel value $X_{m,n}$ to obtain the target pixel value Y by the equation (5) Thus, all pixels of the image data are converted to increase the MTF.

To decrease the MTF, the value of the target pixel is added to the values of the surrounding pixels. A sum is divided by a number of pixels E to obtain an average. Thus, all pixels of the image data are converted to increase the MTF.

To adjust smoothness, it is possible to assign different values instead of the average to the target pixel and the surrounding pixels. In this case, an arbitrary integer is assigned to the matrix coefficients to adjust the target pixel value Y by an equation (6) below.

$$Y = \{(X_{m-2,n-2} X A_{m-2,n-2}) + (X_{m-2,n-1} X A_{m-2,n-1}) + \ldots + (X_{m+2,n+2} X A_{m+2,n+2})\}/E \quad (6)$$

As described above, filtering modulates the MTF of the multi-value image data to emphasize or smooth an image.

Figure 20:
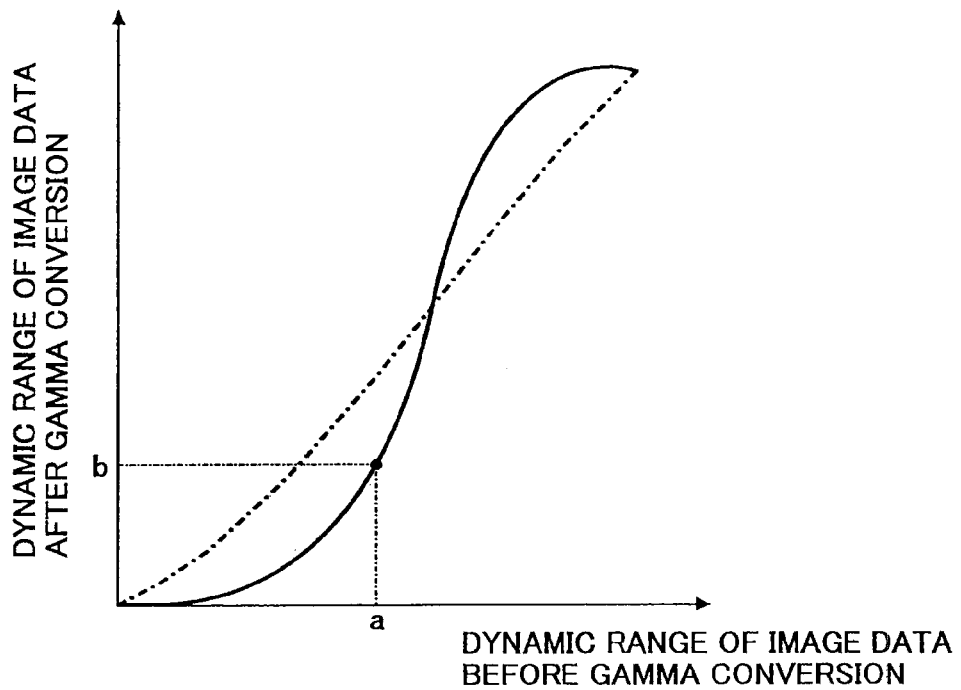
FIG. 20 is a graph illustrating an exemplary gamma conversion table.
Figure 21:
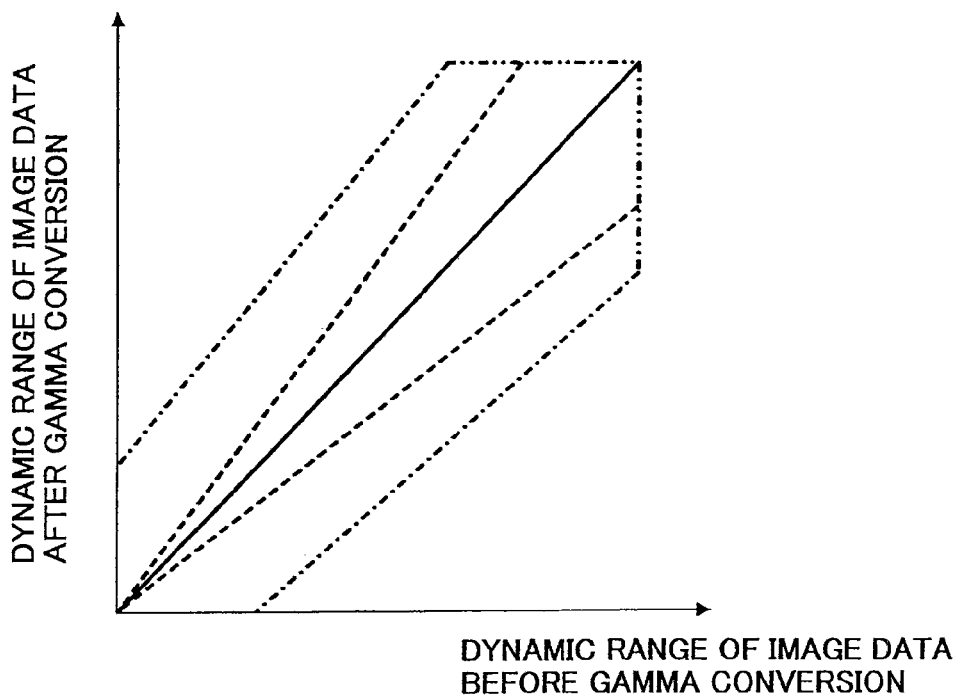
FIG. 21 is a graph illustrating another exemplary gamma conversion table.

Referring to FIGS. 20 and 21, gamma conversion operations are explained. Gamma conversion converts density gradient and density characteristic of an image based on a predetermined gamma table (i.e., gamma conversion characteristic). FIG. 20 is a graph illustrating an exemplary gamma conversion table. The horizontal axis shows a dynamic range of image data before gamma conversion. The vertical axis shows a dynamic range of image data after gamma conversion. Gamma conversion tables are illustrated in a solid line and an alternate long and short dashed line.

According to the gamma conversion table illustrated in the solid line, a value of image data before gamma conversion (i.e., "a" on the horizontal axis) is converted into a value of image data after gamma conversion (i.e., "b" on the vertical axis). Changing a curve of the gamma conversion table may generate image data having arbitrary density distribution. For example, if the gamma conversion table illustrated in the alternate long and short dashed line is used instead of the linear gamma conversion table illustrated in the solid line, image data having smoother density gradient may be generated.

FIG. 21 is a graph illustrating another exemplary gamma conversion table. The horizontal axis shows a dynamic range of image data before gamma conversion. The vertical axis shows a dynamic range of image data after gamma conversion. A linear gamma conversion table is illustrated in a solid line. Gamma conversion tables having changed density gradients are illustrated in broken lines. Gamma conversion tables having entirely changed density gradients are illustrated in alternate long and short dashed lines.

The solid line indicating the linear gamma conversion table extends from an origin at an angle of 45 degrees. To change density of an entire image without changing density characteristic of the linear gamma conversion table, the gamma conversion table may be parallel shifted in a horizontal direction, as illustrated in the alternate long and short dashed lines. To change density gradient of an image, gradient of the gamma conversion table may be changed, as illustrated in the broken lines.

To change density characteristic, the curves of the gamma conversion table, which includes successive curves as illustrated in FIG. 20, may be changed. Thus, changing the gamma conversion table may arbitrarily convert density gradient and density characteristic.

Figure 22:
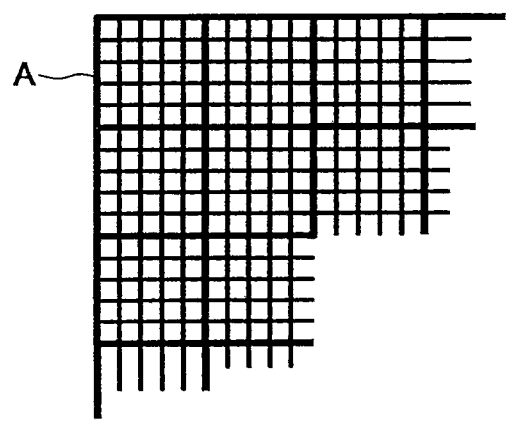
FIG. 22 is an illustration for explaining quantization by dithering.
Figure 23:
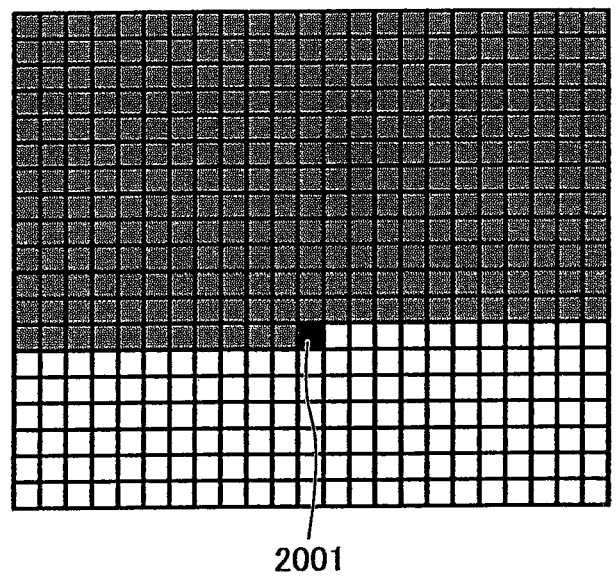
FIG. 23 is an illustration for explaining quantization by error diffusion.

Referring to FIGS. 22 and 23, halftone processing operations are explained. Halftone processing quantizes multi-value image data into binary or approximate-value image data. Various methods are proposed for halftone processing. Simple quantization, dithering, and error diffusion, which are generally used, are explained below for quantizing into binary image data.

Simple quantization quantizes multi-value image data into binary image data by defining an arbitrary value in a dynamic range as a threshold. For example, to quantize 256-gradient image data into image data having 0- and 1-quantization levels by defining 128 in the dynamic range of 0 to 255 as the threshold, 100 and 200 are respectively quantized into 0- and 1-quantization levels.

FIG. 22 is an illustration for explaining quantization by dithering. An area A sectioned with heavy lines forms a threshold matrix. One threshold matrix indicates one threshold. One threshold matrix is assigned to one pixel. Image data is quantized into 2-gradient image data per pixel. Varied thresholds in the matrix within the dynamic range of the image data trade off resolution of the image. However, even 2-gradient image data may produce halftone density.

FIG. 23 is an illustration for explaining quantization by error diffusion. Error diffusion quantizes multi-value image data into binary image data by defining an arbitrary value in a dynamic range as a threshold. Quantization error, which occurs during quantization, is stored. Quantization is performed by considering errors between a target pixel 2001 and surrounding pixels (i.e., shaded pixels), which are determined after quantization is finished in accordance with raster order. Thus, errors which occur during quantization may decrease in the entire image data.

To quantize 256-gradient image data into image data having 0- and 1-quantization levels by defining 128 in the dynamic range of 0 to 255 as the threshold, 100 is quantized into 0-quantization level. Thus, halftone density information indicated by 100 is lost. Subtracting 0 (i.e., a minimum value of the dynamic range) from 100 gives 100, which is quantization error of the image data. 200 is quantized into 1-quantization level. Halftone density information indicated by 200 is lost. Subtracting 255 (i.e., a maximum value of the dynamic range) from 200 gives −55, which is quantization error of the image data.

The quantization errors are stored per pixel separately from the image data after quantization is finished. The image data is processed in raster order. Therefore, quantization errors of the shaded pixels are determined and stored separately from the image data. To quantize the target pixel 2001, an average of the determined quantization errors of the surrounding pixels is added to the value of the target pixel 2001. Thus, loss of the halftone density information caused by quantization in the entire image data may be suppressed.

Figure 24:
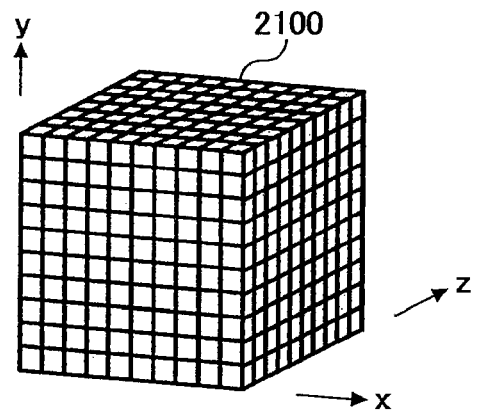
FIG. 24 is an illustration for explaining table interpolation.
Figure 25:
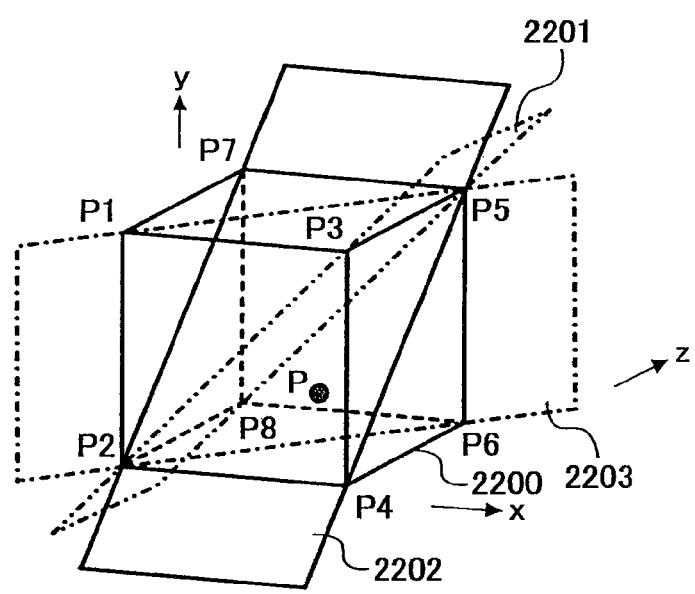
FIG. 25 is an illustration for explaining tetrahedral interpolation.
Figure 26:
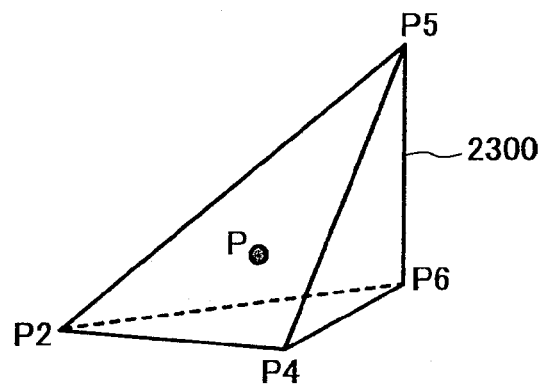
FIG. 26 is an illustration for explaining tetrahedral interpolation.

Referring to FIGS. 24 to 26, color space conversion operations are explained. Various methods are known for color space conversion. FIG. 24 is an illustration for explaining table interpolation. Each axis of a unit cube 2100 in an input color space is divided into ten pieces. The input color space is divided into upper and lower levels. The upper level refers to an LUT (look up table). The lower level performs three-dimensional interpolation. Thus, accurate output may be obtained.

Various methods are known for three-dimensional interpolation. FIGS. 25 and 26 are illustrations for explaining tetrahedral interpolation. The input color space is divided into a plurality of unit cubes, and then a unit cube 2200 including an input color signal P is selected. In FIG. 25, points P1 to P8 indicate vertexes of the unit cube 2200. Lower coordinates (i.e., x', y', and z') of the input color signal P in the selected unit cube 2200 are obtained.

The unit cube 2200 is divided by an x-y plane 2201, a y-z plane 2202, and an x-z plane 2203. Thus, the unit cube 2200 is divided into six unit tetrahedrons. FIG. 26 illustrates a unit tetrahedron 2300 including the input color signal P. Parameters (i.e., lattice point parameters) of boundary points (i.e., the points P1 to P8) of a unit tetrahedron selected by upper coordinates (i.e., x, y, and z) of the input color signal P are referred to in the LUT.

A unit tetrahedron is selected by comparing lower coordinates. Linear interpolation is performed per unit tetrahedron to calculate an output $P_{out}$ of the input color signal P. The output $P_{out}$ is calculated by any one of equations (7) to (12) below based on a relationship between the lower coordinates. "L" indicates length of a side of the unit tetrahedron.

$$(x'<y'<z') P_{out}=P2+(P5-P7)Xx'/L+(P7-P8)Xy'/L+ (P8-P2)Xz'/L \quad (7)$$

$$(y'\square x'<z') P_{out}=P2+(P6-P8)Xx'/L+(P5-P6)Xy'/L+ (P8-P2)Xz'/L \quad (8)$$

$$(y'<z'\square x') P_{out}=P2+(P4-P2)Xx'/L+(P5-P6)Xy'/L+ (P6-P4)Xz'/L \quad (9)$$

$$(z'\square y'\square x') P_{out}=P2+(P4-P2)Xx'/L+(P3-P4)Xy'/L+ (P5-P3)Xz'/L \quad (10)$$

$$(z'\square x'<y') P_{out}=P2+(P3-P1)Xx'/L+(P1-P2)Xy'/L+ (P5-P3)Xz'/L \quad (11)$$

$$(x'<z'\square y') P_{out}=P2+(P5-P7)Xx'/L+(P1-P1)Xy'/L+ (P7-P1)Xz'/L \quad (12)$$

As described above, the image data format converter 127 performs various processing on image data, so that the image processing apparatus 100 may send the image data in a format specified by the client computer 131. Thus, the image data may be used in various formats.

Figure 27:
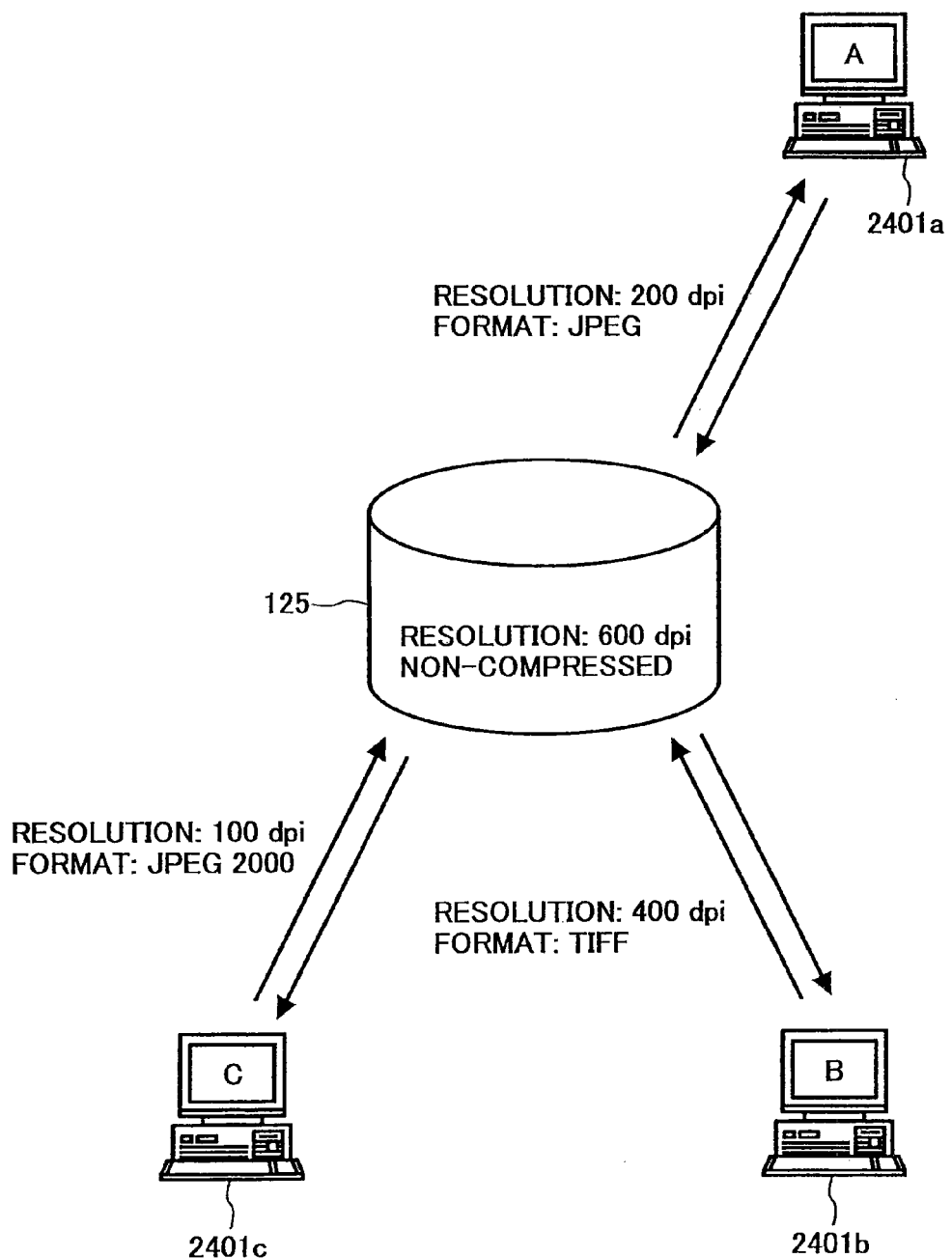
FIG. 27 is an illustration illustrating sending and receiving image data between an HDD (hard disc drive) and client computers shown in FIG. 4.

Referring to FIG. 27, operations when a plurality of client computers 2401a, 2401b, and 2401c request the image processing apparatus 100 to send image data stored in the HDD 125 are explained.

The HDD 125 is connected via the NIC 126 and the network 130 with the plurality of the client computers 2401a, 2401b, and 2401c. When requesting the image processing apparatus 100 to send image data, the client computers 2401a, 2401b, and 2401c send the image processing apparatus 100 an image data request signal for specifying the image data and its format.

The image data request signal specifies property information of the image data, such as parameters for color space conversion, expansion, compression, resolution conversion, filtering, halftone processing, density gamma conversion, and noise removal. Parameters for processing performed by the image data format converter 127 are determined based on the property information.

The HDD 125 stores print image data for which the client computers 2401a, 2401b, and 2401c send a print request, and property information of the print image data. The property information includes parameters for color space conversion, expansion, compression, resolution conversion, filtering, halftone processing, density gamma conversion, and noise removal. Parameters for processing performed by the image data format converter 127 are determined based on the property information. The memory controller 120 determines parameters for processing performed by the image data format converter 127 based on the property information requested by the client computers 2401a, 2401b, and 2401c, that is the property information specified by the image data request signal, and the property information of the stored print image data. The property information of the stored print image data usually includes various parameters, such as parameters for color space conversion and expansion. When the property information of the stored print image data and the property information requested by the client computers 2401a, 2401b, and 2401c include a common property, a parameter for the common property is determined based on the property information requested by the client computers 2401a, 2401b, and 2401c. When the property information requested by the client computers 2401a, 2401b, and 2401c includes parameters for color space conversion and resolution conversion, for example, the image data format converter 127 performs color space conversion and resolution conversion based on the parameters for color space conversion and resolution conversion requested by the client computers 2401a, 2401b, and 2401c. The image data format converter 127 performs the other processing, such as expansion, compression, and filtering, based on parameters included in the property information of the stored print image data.

The client computers 2401a, 2401b, and 2401c can change or add the property information of the stored print image data before the print image data is read from the HDD 125 and sent to the client computers 2401a, 2401b, and 2401c. If the print image data can be read from the HDD 125 and sent to the client computers 2401a, 2401b, and 2401c, the client computers 2401a, 2401b, and 2401c need not specify the property information of the print image data.

In FIG. 27, the HDD 125 stores binary, non-compressed image data having a resolution of 600 dpi. The client computers 2401a, 2401b, and 2401c respectively request the image processing apparatus 100 to send 200 dpi image data in the JPEG format, 400 dpi image data in the TIFF format, and 100 dpi image data in a JPEG 2000 format.

The image data format converter 127 performs processing on the image data stored in the HDD 125 in accordance with requests from the client computers 2401a, 2401b, and 2401c. The expander 701 performs no processing because the image data stored in the HDD 125 is not compressed.

The resolution converter 702 determines parameters for resolution conversion based on the resolution of the image data stored in the HDD 125 and the resolutions specified by the client computers 2401a, 2401b, and 2401c. The resolution converter 702 converts the 600 dpi image data into 200 dpi image data so as to send the 200 dpi image data to the client computer 2401a. The resolution converter 702 converts the 600 dpi image data into 400 dpi image data so as to send the 400 dpi image data to the client computer 2401b. The resolution converter 702 converts the 600 dpi image data into 100 dpi image data so as to send the 100 dpi image data to the client computer 2401c.

The compressor 707 converts image data stored in the HDD 125 into image data in the JPEG format, the TIFF format, and the JPEG 2000 format so as to send the converted image data to the client computers 2401a, 2401b, and 2401c.

As described above, the image processing apparatus 100 according to the present embodiment converts image data into image data in a format specified by an external device, and then sends the converted image data to the external device. Thus, the image data may be utilized.

Figure 28:
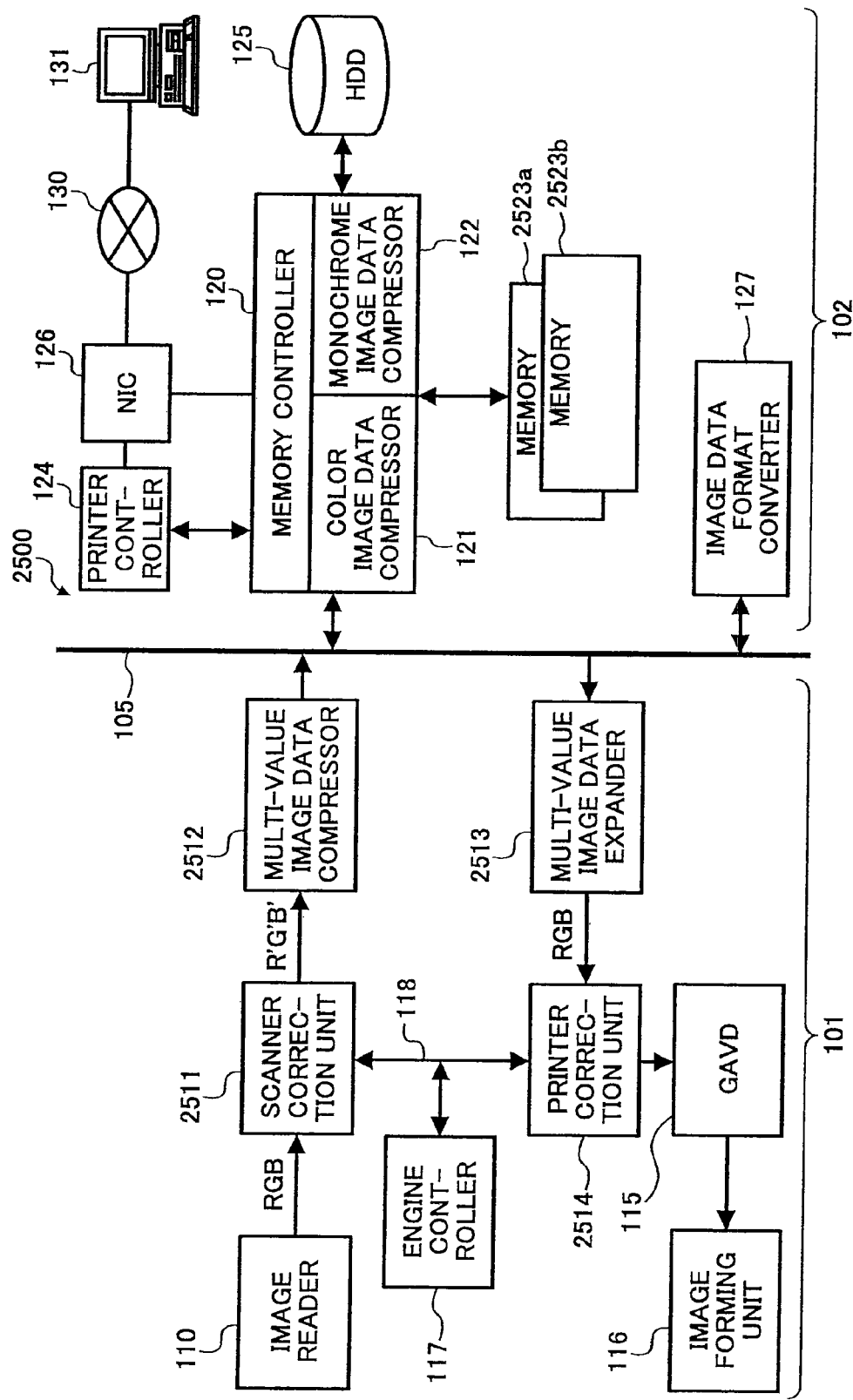
FIG. 28 is a block diagram of an image processing apparatus according to another exemplary embodiment of the present invention.

According to the present embodiment, the image processing apparatus 100 converts scanned RGB image data into CMYK image data, and then stores the converted image data into the HDD 125. According to another embodiment as illustrated in FIG. 28, an image processing apparatus 2500 stores scanned RGB image data without converting it into CMYK image data. The client computer 131 executes an image processing program stored in a memory (not shown), so that the image processing apparatus 2500 performs processing described below.

As illustrated in FIG. 28, the image processing apparatus 2500 has a structure similar to that of the image processing apparatus 100 illustrated in FIG. 4. The image processing apparatus 2500 replaces the image processing apparatus 100. A scanner correction unit 2511 replaces the scanner correction unit 111. A multi-value image data compressor 2512 replaces the multi-value image data compressor 112. A multi-value image data expander 2513 replaces the multi-value image data expander 113. A printer correction unit 2514 replaces the printer correction unit 114. Memories 2523a and 2523b replace the memories 123a, 123b, 123c, and 123d. The fax controller 140, the binary image data expander 141, and the public circuit 142 are not included.

The scanner correction unit 2511 is configured to perform scanner gamma processing, filtering, color correction, and reducing and enlarging on RGB image data sent from the image reader 110, and then send the processed image data to the multi-value image data compressor 2512. The multi-value image data compressor 2512 is configured to perform fixed-length compression on the processed image data sent from the scanner correction unit 2511. The multi-value image data expander 2513 is configured to expand the compressed image data into 8-bit image data, and then send the expanded image data to the printer correction unit 2514. The printer correction unit 2514 is configured to convert the RGB image data sent from the multi-value image data expander 2513 into CMYK image data, perform printer gamma processing and halftone processing on the converted image data, adjust delays, and then send the processed image data to the GAVD 115. The memory 2523a is configured to form a band memory for storing graphics and page layout information. The memory 2523b is configured to form a page memory for storing page data.

Figure 29:
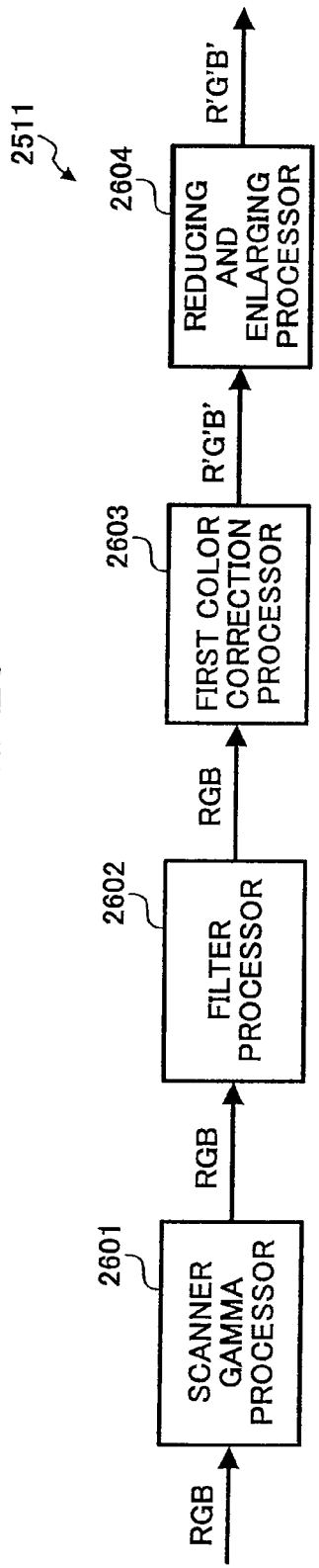
FIG. 29 is a schematic block diagram of a scanner correction unit shown in FIG. 28.

As illustrated in FIG. 29, the scanner correction unit 2511 includes a scanner gamma processor 2601, a filter processor 2602, a first color correction processor 2603, and a reducing and enlarging processor 2604.

The scanner gamma processor 2601 is configured to perform scanner gamma processing on RGB image data sent from the image reader 110, and then send the processed image data to the filter processor 2602. The filter processor 2602 is configured to perform filtering on the RGB image data sent from the scanner gamma processor 2601, and then send the processed image data to the first color correction processor 2603. The first color correction processor 2603 is configured to perform color correction on the RGB image data sent from the filter processor 2602, convert the RGB image data into R' G' B' image data, and then send the R'G'B' image data to the reducing and enlarging processor 2604. The reducing and enlarging processor 2604 is configured to perform reducing or enlarging on the R'G'B' image data sent from the first color correction processor 2603, and then send the processed image data to the multi-value image data compressor 2512.

The first color correction processor 2603 converts RGB color signals into RGB signals in other format (i.e., R' G' B' signals). The R'G'B' signals are RGB signals accommodating to an sRGB or NTSC standard, or a standard specific to the image processing apparatus 2500. The first color correction processor 2603 may send the RGB image data without converting it into the R'G'B' image data.

Figure 30:
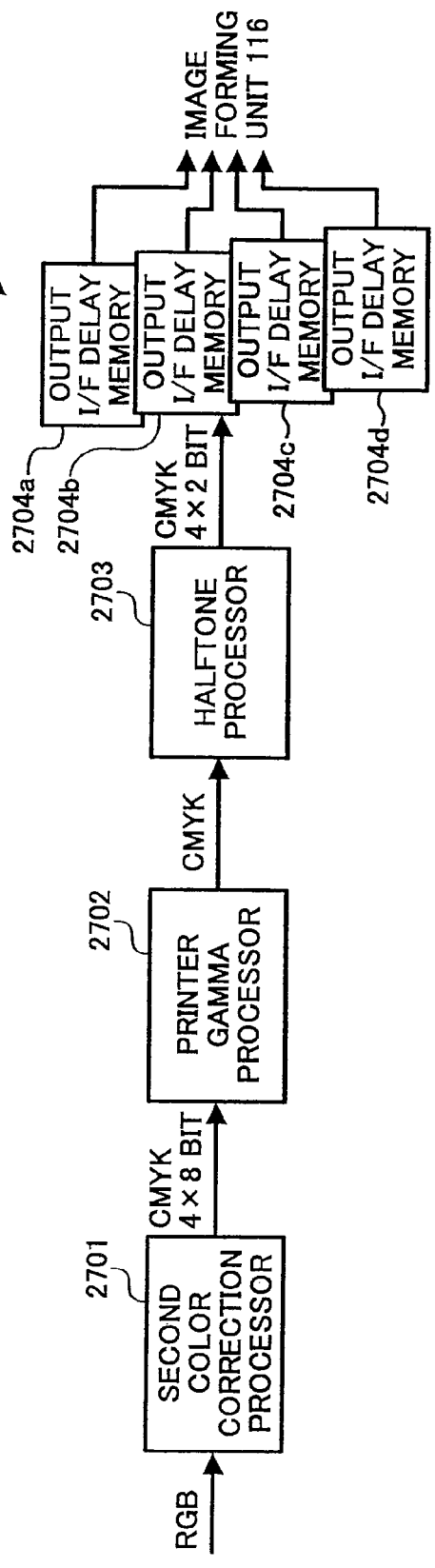
FIG. 30 is a schematic block diagram of a printer correction unit shown in FIG. 28.

As illustrated in FIG. 30, the printer correction unit 2514 includes a second color correction processor 2701, a printer gamma processor 2702, a halftone processor 2703, and output I/F delay memories 2704a, 2704b, 2704c, and 2704d.

The second color correction processor 2701 is configured to convert RGB image data sent from the multi-value image data expander 2513 into CMYK image data, and then send the converted image data to the printer gamma processor 2702. The printer gamma processor 2702 is configured to perform printer gamma processing on the CMYK image data sent from the second color correction processor 2701, and then send the processed image data to the halftone processor 2703. The halftone processor 2703 is configured to perform halftone processing on the image data sent from the printer gamma processor 2702, and then send the processed image data to the output I/F delay memories 2704a, 2704b, 2704c, and 2704d. The output I/F delay memories 2704a, 2704b, 2704c, and 2704d are configured to respectively form delay memories for the CMYK colors.

If the RGB image data sent from the multi-value image data expander 2513 is monochrome image data, the second color correction processor 2701 converts the RGB image data into 8-bit grayscale image data. The output I/F delay memories 2704a, 2704b, 2704c, and 2704d respectively adjust delays to match with timings for forming images in the CMYK colors, because the image data in the CMYK colors is output in parallel.

Referring to FIG. 28, copying operations are explained. The image reader 110 scans an image on an original, converts the scanned image into RGB image data, and then sends the RGB image data to the scanner correction unit 2511. The scanner correction unit 2511 performs scanner gamma processing, filtering, color correction, and reducing and enlarging on the RGB image data sent from the image reader 110, and then sends the processed image data to the multi-value image data compressor 2512.

The multi-value image data compressor 2512 performs fixed-length compression on the processed image data sent from the scanner correction unit 2511. Namely, the multi-value image data compressor 2512 compresses 8-bit color image data into image data in the JPEG or JPEG 2000 format. The compressed image data is sent via the global bus 105 to the memory controller 120. The memory controller 120 stores the compressed image data into the memories 2523a and 2523b. The stored image data is written into the HDD 125 as needed.

The compressed image data stored in the memories 2523a and 2523b is sent via the global bus 105 to the multi-value image data expander 2513. The multi-value image data expander 2513 expands the compressed image data into 8-bit image data, and then sends the expanded image data to the printer correction unit 2514. The printer correction unit 2514 performs processing on the expanded image data sent from the multi-value image data expander 2513, and then sends the processed image data via the GAVD 115 to the image forming unit 116. The image forming unit 116 forms an image on a transfer sheet.

Referring to FIG. 28, operations when the client computers 131 requests the image processing apparatus 2500 to print an image are explained. The client computer 131 sends a print request for requesting the image processing apparatus 2500 to print an image. The memory controller 120 interprets the print request and creates 8-bit RGB image data. The memory 2523a stores the 8-bit RGB image data. In this case, the memory 2523b stores print property information such as characters, graphics, and images in an object. The color image data compressor 121 or the monochrome image data compressor 122 compresses the 8-bit RGB image data stored in the memory 2523a. The HDD 125 stores the compressed image data.

The compressed imaged data stored in the HDD 125 and the print property information stored in the memory 2523b are sent to the engine section 101. The multi-value image data expander 2513 expands the compressed image data into the original 8-bit RGB image data. The printer correction unit 2514 converts the expanded image data into CMYK image data based on the print property information. The image forming unit 116 forms an image on a transfer sheet.

Figure 31:
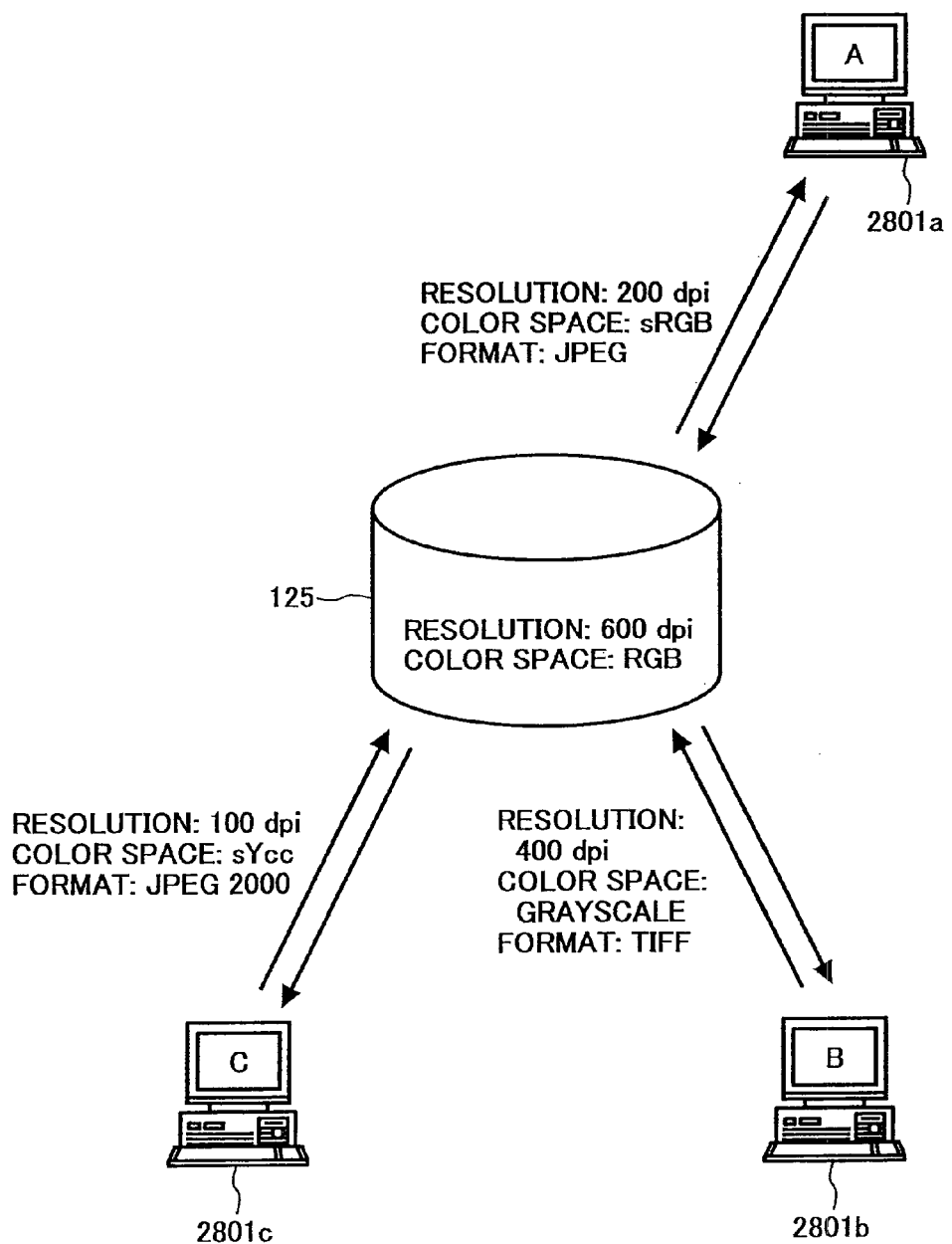
FIG. 31 is an illustration illustrating sending and receiving image data between an HDD (hard disc drive) and client computers shown in FIG. 28.

Referring to FIG. 31, operations when a plurality of client computers 2801a, 2801b, and 2801c request the image processing apparatus 2500 to send image data stored in the HDD 125 are explained.

The HDD 125 is connected via the NIC 126 and the network 130 with the plurality of the client computers 2801a, 2801b, and 2801c. When requesting the image processing apparatus 2500 to send image data, the client computers 2801a, 2801b, and 2801c send the image processing apparatus 2500 an image data request signal for specifying the image data and its format.

The memory controller 120 determines parameters for processing performed by the image data format converter 127 based on property information specified by the image data request signal and property information of the image data stored in the HDD 125. When the property information specified by the image data request signal includes parameters for resolution conversion, color space conversion, and compression, for example, parameters for the resolution converter 702, the color space converter 703, and the compressor 707 of FIG. 10 are changed in accordance with the parameters.

In FIG. 31, the HDD 125 stores RGB image data having a resolution of 600 dpi, which is arbitrary color space image data scanned as image data for color printing. The client computers 2801a, 2801b, and 2801c respectively request the image processing apparatus 2500 to send 200 dpi sRGB color space image data in the JPEG format, 400 dpi monochrome image data in the TIFF format, and 100 dpi sYcc color space image data in the JPEG 2000 format.

The image data format converter 127 performs processing on the image data stored in the HDD 125 in accordance with requests from the client computers 2801*a*, 2801*b*, and 2801*c*. The resolution converter 702 determines parameters for resolution conversion based on the resolution of the image data stored in the HDD 125 and the resolutions specified by the client computers 2801*a*, 2801*b*, and 2801*c*. The resolution converter 702 converts the 600 dpi image data into 200 dpi image data so as to send the 200 dpi image data to the client computer 2801*a*. The resolution converter 702 converts the 600 dpi image data into 400 dpi image data so as to send the 400 dpi image data to the client computer 2801*b*. The resolution converter 702 converts the 600 dpi image data into 100 dpi image data so as to send the 100 dpi image data to the client computer 2801*c*.

The color space converter 703 performs color space conversion based on the requests from the client computers 2801*a*, 2801*b*, and 2801*c*. The color space converter 703 converts the RGB image data into sRGB image data so as to send the sRGB image data to the client computer 2801*a*. The color space converter 703 converts the RGB image data into grayscale image data so as to send the grayscale image data to the client computer 2801*b*. The color space converter 703 converts the RGB image data into sYcc image data so as to send the sYcc image data to the client computer 2801*c*.

The image processing apparatus 2500 may store color image data by using RGB signals specific to the image processing apparatus 2500. In this case, the color space converter 703 converts the color image data into sRGB or Lab (i.e., generic color space) image data, and then sends the converted image data to an external device.

To decrease size of the image data, the color image data is converted into monochrome image data based on an equation (13) below.

$$S=(R+2G+B)/4 \tag{13}$$

In the above equation (13), "S" indicates grayscale image data.

The compressor 707 converts the image data into image data in a format specified by the client computer 2801*a*, 2801*b*, or 2801*c*. The compressor 707 converts the image data into image data in the JPEG format so as to send the image data in the JPEG format to the client computer 2801*a*. The compressor 707 converts the image data into image data in the TIFF format so as to send the image data in the TIFF format to the client computer 2801*b*. The compressor 707 converts the image data into image data in the JPEG 2000 format so as to send the image data in the JPEG 2000 format to the client computer 2801*c*.

As described above, the image processing apparatus 2500 according to the present embodiment converts image data stored in the HDD 125 into image data in a format specified by an external device, and then sends the converted image data to the external device. Thus, the image data may be utilized.

The image processing program according to the above embodiments may be stored into a recording medium such as a CD-ROM or a semiconductor memory.

The image processing apparatus 100 or 2500 receives image data from the client computer 131 or the facsimile 143. An external scanner or a scanner connected with the image processing apparatus 100 or 2500 may scan an image on an original, so that print image data is generated based on the scanned image.

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

What is claimed is:

1. An apparatus connectable to at least a first image sending device and a second image sending device, and to a plurality of image requesting devices which are separate devices connected by a network, comprising:
    an image data receiving unit configured to receive at least first image data from the first image sending device and second image data from the second image sending device, the first image data and the second image data each having an image format, the image format of the first image data being different from the image format of the second image data;
    a storing unit configured to store the at least first image data and second image data respectively received from the first image sending device and the second image sending device for access by any of the plurality of image requesting devices;
    a request receiving unit configured to receive, from one of the plurality of image requesting devices, a request for selecting image data among the at least first and second image data which have different image formats and are stored in the storing unit, and a format indication for the selected image data;
    an image data format converter configured to convert the image format of the selected image data to an image format indicated by the format indication received by the request receiving unit; and
    a sending unit configured to send the converted image data in the format indicated by the format indication to the one of the plurality of requesting devices.

2. The apparatus of claim 1, wherein the sending unit sends the converted image data to the one image requesting device which sent the request and the format indication via an IP (internet protocol) network.

3. The apparatus of claim 1, wherein a format indicated by the format indication is in one of JPEG, TIFF, and GIF formats.

4. The apparatus of claim 1, wherein at least one of the image requesting devices also functions as a first image sending device.

5. The apparatus of claim 1, wherein the request receiving unit is configured to receive the request for selecting image data and the format indication as a single request.

6. A method of communicating image data between at least a first image sending apparatus and a second image sending apparatus, and a plurality of image requesting apparatuses which are separate apparatuses connected by a network, comprising:
    receiving at least first and second image data respectively from the first image sending apparatus and second image sending apparatus, the first image data and the second image data each having an image format, the image format of the first image data being different from the image format of the second image data;
    storing the at least first image data and second image data respectively received from the first image sending apparatus and the second image sending apparatus, in a storing unit for access by any of the plurality of image requesting apparatuses;
    receiving at a request receiving unit a request from at least one image requesting-apparatus, a request for selecting image data among the at least first and second image data which have different image formats and are stored in the storing unit, and a format indication for the selected image data;

converting the image format of the selected image data to an image format indicated by the format indication received by the request receiving unit; and, sending converted image data to the at least one image requesting apparatus which sent the request and the format indication.

7. The method of claim 6, wherein the converted image data is sent to the at least one image requesting apparatus which sent the request and the format indication via an IP (internet protocol) network.

8. The method of claim 6, wherein a format indicated by the format indication is in one of JPEG, TIFF, and GIF formats.

9. A multi-function image apparatus connectable through a network to a plurality of client devices, each capable of sending first image data in a first format, and further connectable to an image sending device capable of sending image data in a second format different from the first, the apparatus comprising:

an image data receiving unit configured to receive the first image data from any one of the client devices through the network and the second image data from the image sending device;

a storing unit configured to store the first image data and the second image data for access through the network by any of the plurality of client devices;

a request receiving unit configured to receive, from any one of the client devices as a requesting client device, a request for selecting image data among the first and second image data stored in the storing unit and a format indication for the selected image data;

an image data format converter configured to convert the image format of the selected image data to an image format indicated by the format indication received by the request receiving unit; and, a sending unit configured to send the converted image data in the format indicated by the format indication to the requesting client device.

10. The multi-function image apparatus of claim 9, wherein the sending unit sends the converted image data to the one image requesting device which sent the request and the format indication via an IP (internet protocol) network.

11. The multi-function image apparatus of claim 9, wherein a format indicated by the format indication is in one of JPEG, TIFF, and GIF formats.

12. The multi-function image apparatus of claim 9, wherein the request receiving unit is configured to receive the request for selecting image data and the format indication as a single request.

\* \* \* \* \*